(12) United States Patent
Saxena et al.

(10) Patent No.: US 11,308,100 B2
(45) Date of Patent: Apr. 19, 2022

(54) DYNAMICALLY ASSIGNING QUERIES TO SECONDARY QUERY PROCESSING RESOURCES

(71) Applicant: Amazon Technologies, Inc., Seattle, WA (US)

(72) Inventors: Gaurav Saxena, Cupertino, CA (US); Ippokratis Pandis, Menlo Park, CA (US); Mengchu Cai, San Jose, CA (US); Mingda Li, Los Angeles, CA (US); Mohammad Rezaur Rahman, Fremont, CA (US); Naresh Chainani, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 148 days.

(21) Appl. No.: 16/452,385

(22) Filed: Jun. 25, 2019

(65) Prior Publication Data
US 2020/0409949 A1    Dec. 31, 2020

(51) Int. Cl.
| | |
|---|---|
| G06F 16/245 | (2019.01) |
| G06F 16/2458 | (2019.01) |
| G06F 16/2455 | (2019.01) |
| G06F 16/28 | (2019.01) |
| G06F 9/38 | (2018.01) |

(52) U.S. Cl.
CPC .... *G06F 16/2458* (2019.01); *G06F 16/24561* (2019.01); *G06F 16/285* (2019.01); *G06F 9/3877* (2013.01)

(58) Field of Classification Search
None
See application file for complete search history.

(56) References Cited

U.S. PATENT DOCUMENTS

| | | | | |
|---|---|---|---|---|
| 5,905,898 | A | * | 5/1999 | Qureshi ................. G06F 16/90 |
| 6,502,062 | B1 | * | 12/2002 | Acharya ........... G06F 16/24561 |
| 6,769,017 | B1 | | 7/2004 | Bhat et al. |
| 7,058,622 | B1 | | 6/2006 | Tedesco |
| 7,290,015 | B1 | * | 10/2007 | Singhal ................. G06F 16/20 707/999.202 |
| 9,032,017 | B1 | | 5/2015 | Singh et al. |
| 9,137,287 | B2 | * | 9/2015 | Alecci .................... G06F 16/285 |
| 9,477,710 | B2 | | 10/2016 | Narasayya et al. |
| 2003/0014526 | A1 | * | 1/2003 | Pullara .............. G06F 16/24561 |
| 2003/0126114 | A1 | | 7/2003 | Tedesco |

(Continued)

OTHER PUBLICATIONS

U.S. Appl. No. 16/364,055, filed Mar. 25, 2019, Mingda Li.
(Continued)

*Primary Examiner* — Son T Hoang
(74) *Attorney, Agent, or Firm* — Robert C. Kowert; Kowert, Hood, Munyon, Rankin & Goetzel, P.C.

(57) ABSTRACT

A primary query engine may receive a query and determine whether the query is eligible for performance at a secondary query engine. If eligible, the primary query engine may evaluate the availability of the first query engine to perform the query. The first query engine may determine whether to assign the query to the primary query engine or to the secondary query according to availability evaluation. For queries assigned to the secondary query engine, the primary query engine may send a request to the secondary query engine to being processing of the query.

20 Claims, 14 Drawing Sheets

(56) References Cited

U.S. PATENT DOCUMENTS

| | | |
|---|---|---|
| 2006/0167883 A1 | 7/2006 | Boukobza |
| 2008/0270346 A1 | 10/2008 | Mehta et al. |
| 2009/0254774 A1 | 10/2009 | Chamdani et al. |
| 2010/0082603 A1 | 4/2010 | Krompass et al. |
| 2010/0198777 A1 | 8/2010 | Lo et al. |
| 2010/0211637 A1* | 8/2010 | Borzsei ............ G06F 16/24561 |
| 2011/0153662 A1 | 6/2011 | Stanfill et al. |
| 2011/0179014 A1 | 7/2011 | Schechter et al. |
| 2013/0226903 A1 | 8/2013 | Wu et al. |
| 2013/0262678 A1* | 10/2013 | Tung ....................... G06F 16/11 |
| 2014/0019415 A1 | 1/2014 | Barker et al. |
| 2014/0164818 A1* | 6/2014 | Jones .................. G06F 16/2458 |
| 2014/0214880 A1 | 7/2014 | Chi et al. |
| 2016/0162546 A1 | 6/2016 | Oh et al. |
| 2016/0188696 A1 | 6/2016 | Belghiti |
| 2016/0203404 A1 | 7/2016 | Cherkasova et al. |
| 2018/0060132 A1 | 3/2018 | Maru et al. |
| 2018/0060394 A1* | 3/2018 | Gawande .......... G06F 16/90335 |
| 2019/0149605 A1* | 5/2019 | Yang ................... G06F 16/2379 |
| 2019/0197173 A1* | 6/2019 | Tahara ................ G06F 16/2365 |

OTHER PUBLICATIONS

U.S. Appl. No. 16/102,545, filed Aug. 13, 2018, Bhaven Avalani.
U.S. Appl. No. 16/007,697, filed Jun. 13, 2018, Gaurav Saxena.
U.S. Appl. No. 16/435,402, filed Jun. 7, 2019, Stavros Harizopoulos.

* cited by examiner

DYNAMICALLY ASSIGNING QUERIES TO SECONDARY QUERY PROCESSING RESOURCES

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data processing.

For example, data processing is often measured by the speed at which requests to access data are performed. Some types of data access requests require intensive computational and storage access workloads, while other types of data access requests may only involve small amounts of work to process. As data stores may have to process both high and low workload access requests, techniques to perform the different types of access requests at processing resources better suited to the performance of the access requests or processing resources that may improve overall access request processing may be implemented so that access request processing is optimally performed.

Figure 1:
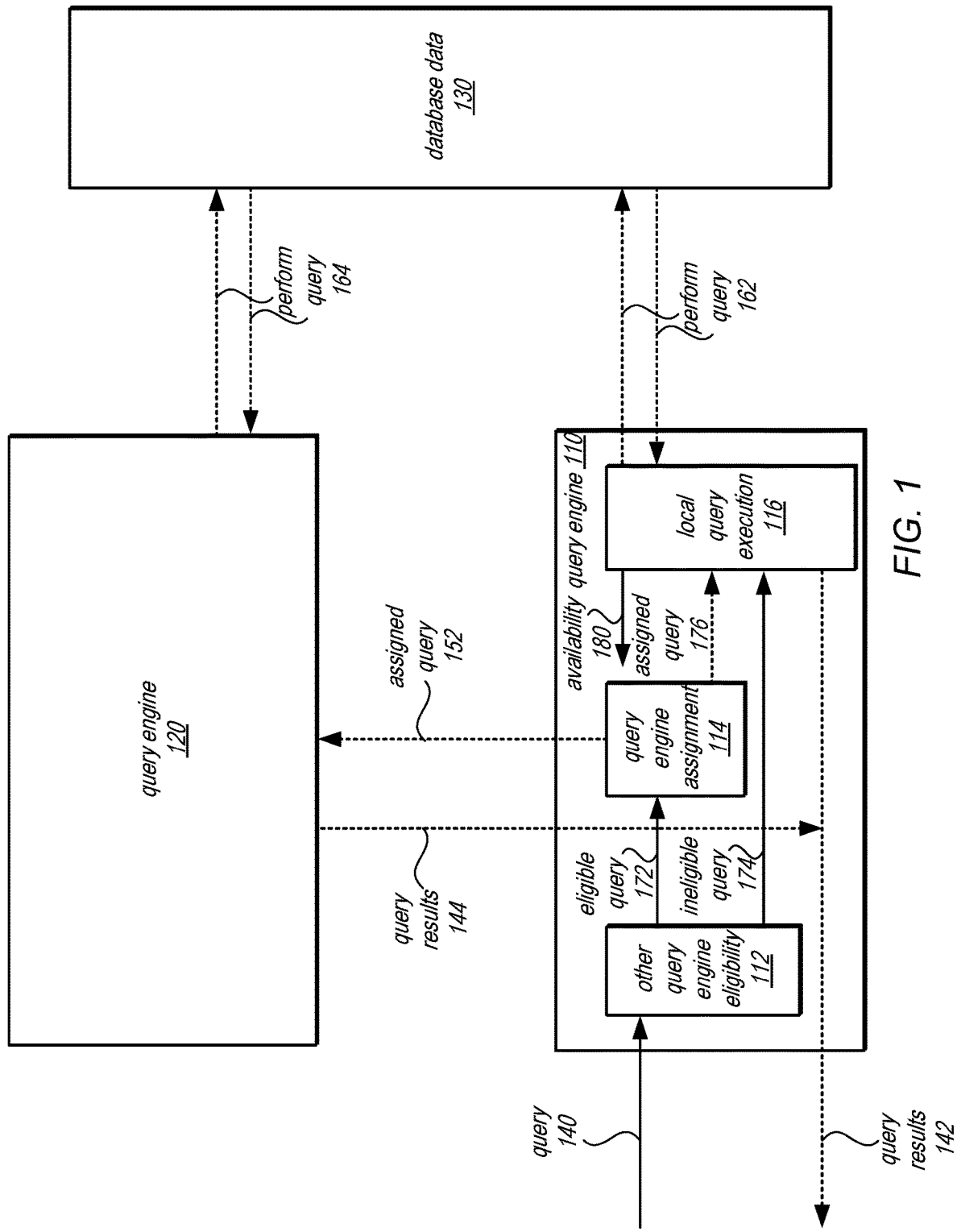
FIG. 1 illustrates a logical block diagram of dynamically assigning queries to secondary processing resources, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for dynamically assigning queries to secondary processing resources are described herein. Queries for data that satisfies various conditions or criteria, insertions, deletions, modifications, or any other request triggering processing based on a request to access a data store may utilize various processing resources, including various central processing units (CPUs), graphical processing units (GPUs), or other processing components that may execute various tasks to process database queries, in some embodiments. Because database queries may vary in terms of the workload placed upon the processing resources to execute the database query, in some embodiments, the amount of processing resources that any one query engine may provide could be inadequate (or underutilized) to meet the demands of some query workloads, in various embodiments.

For example, a query engine could be optimally sized to perform short, quick or other small-sized queries that are performed with a client system expectation that a result of the query will be returned quickly. Long-running, slow, or other large-sized queries may not perform as efficiently at the same query engine (e.g., as it may not be distributed amongst a large number of nodes in a distributed query processing platform like the clusters described below with regard to FIGS. 2-8. Therefore, additional or other secondary capacity provided by an additional query engine (or multiple query engines) may be used to handle increases in workload from database queries or other queries that could be more optimally performed using a different query engine, in some embodiments.

In various embodiments, dynamically assigning queries to secondary processing resources may be implemented to dynamically choose when to utilize secondary resources to perform a query so that the costs of utilizing the secondary resources are not outweighed by its benefits (e.g., providing faster performance for queries to the database overall without increasing resource costs or wasting additional resources), improving the performance of database queries and utilization of resources to perform database queries for a database system overall. Moreover, as assignments of queries are made dynamically, changing conditions (e.g., changing workloads, secondary resource configuration and availability, and so on) may cause initial query assignments to be modified if a more optimal assignment is available as a result of the changed conditions.

Figure 3:
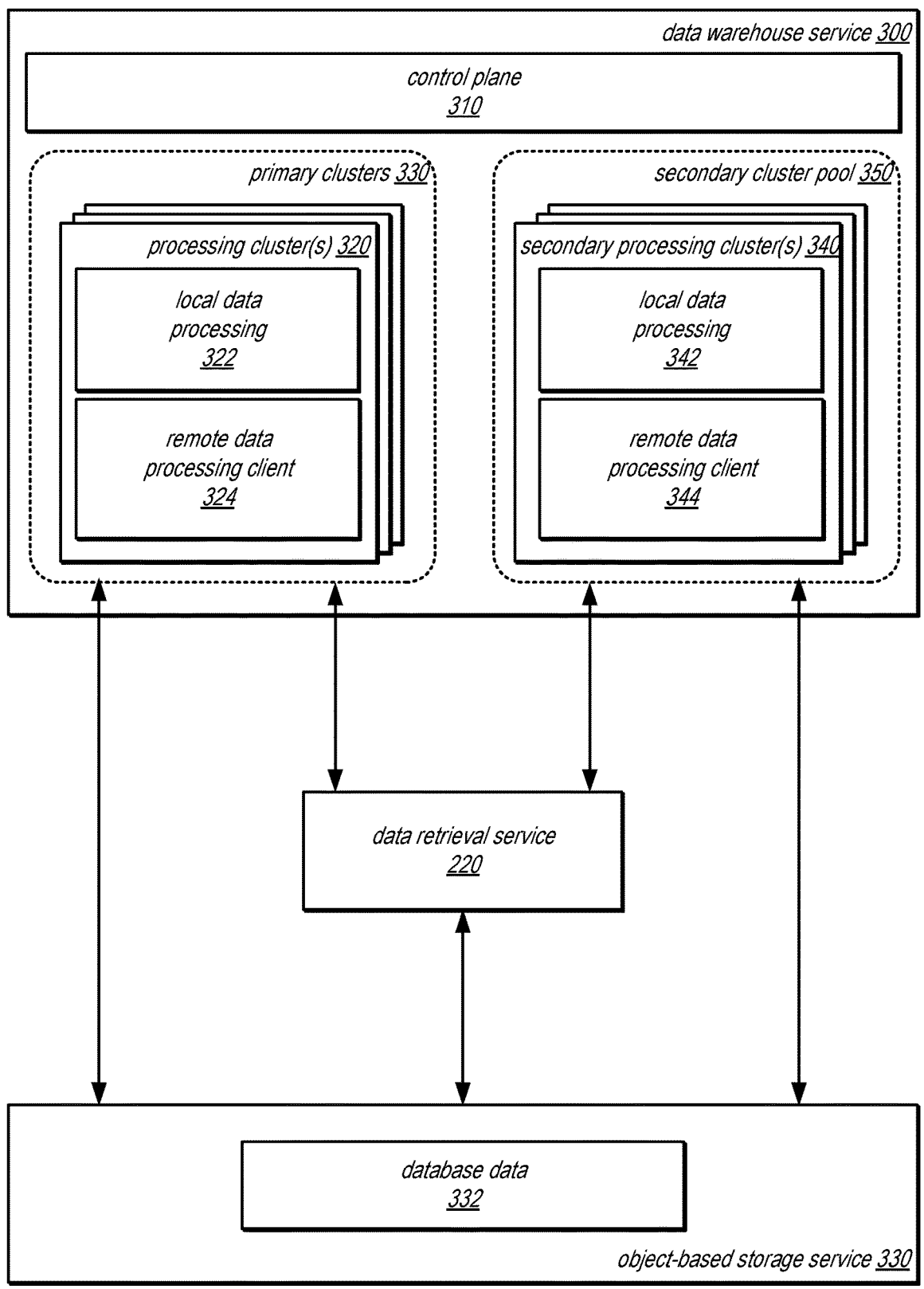
FIG. 3 is a logical block diagram of a data warehouse service implementing primary and secondary processing clusters, according to some embodiments.

FIG. 1 illustrates a logical block diagram of dynamically assigning queries to secondary processing resources, according to some embodiments. Query engine 110 may be a query processing platform, application or system of one or multiple components (e.g., a processing cluster as discussed below that includes one or multiple processing nodes or a single node query engine) that can perform queries, such as query 140 to a database, by accessing database data 130, in some embodiments. Database data 130 may be stored or co-located with query engine 110 in some embodiments (e.g., in attached storage as described below in FIG. 5) or may be a separate data store (e.g., network attached storage and/or a separate storage service, as illustrated in FIG. 3), in some embodiments. Database data 130 may be stored for various types of databases to which queries may be performed (e.g., relational, non-relational, NoSQL, document, graph, etc.), in some embodiments. FIGS. 3-8, for instance, discuss a data warehouse style database that stores database data, as well as other data stores, such as object-based storage service 330 (which may be general data stores which store data other types or formats of data in addition to database data.)

In some embodiments, an additional query engine, such as query engine 120, or multiple additional query engines (not illustrated), may be implemented to perform some queries. Like query engine 110, query engine 120 may be a query processing platform, application or system of one or multiple components (e.g., a processing cluster as discussed below that includes one or multiple processing nodes or a single node query engine) that can perform queries, such as query 140 to a database, by accessing database data 130, in some embodiments. Query engine 120 may be different than query engine 110, in some embodiments (e.g., a different number of nodes, different hardware resources, and/or different engine applications or other query performance components). In some embodiments, query engine 120 may be substantially similar (or the same) as query engine 110.

Query engine 110 may implement techniques for assigning queries to query engine 110 or query engine 120 dynamically. For example, query engine 110 may implement other query engine eligibility analysis 112, which may determine whether a query is eligible to execute on query engine 120. Query types for instance, as well as other techniques discussed below with regard to FIGS. 7 and 9 may be implemented for eligibility analysis. Ineligible queries 174 may be assigned for local query execution 116 at query engine 110, which may perform the query 162. Eligible queries 172, may receive a dynamic assignment by query engine assignment 114. For example, the predicted execution times or other performance costs may be compared to select a more optimal query engine to perform query. Similarly dynamically assigning queries to secondary processing resources, techniques and comparisons could be performed for multiple secondary query engines, in some embodiments. Whether query engine 110 is available to perform the query (or would queue the query until a later time) may be considered by query engine assignment 114 based on availability information 180 which may indicate a current workload of query engine 110. Queries may be assigned 152 to query engine 120 (e.g., according to various techniques discussed below with regard to FIGS. 7 and 9-13) or assigned 176 to local query execution 116. Query engine 120 may perform a query 164 to database data 130. Likewise, query engine 110 may perform a query 162 to database data 130. Results 142 of a query may be returned by query engine 110 in response to query 140. In some embodiments, query engine 120 may return results 144 to query engine 110 which may provide them as results 142.

Please note that the previous description of query engines, dynamic query engine assignment, database data, and performance of queries is a logical description and thus is not to be construed as limiting as to the implementation of these features, or portions thereof. For example, query engine 120 could return query results 144 directly to a client application.

This specification begins with a general description of a provider network that implements multiple different services, including data processing services and storage services, which may perform dynamically assigning queries to secondary processing resources. Then various examples of multiple data processors, such as a data warehouse service and a data retrieval service, including different components/modules, or arrangements of components/module that may be employed as part of implementing the data processors are discussed. A number of different methods and techniques to implement dynamically assigning queries to secondary processing resources are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
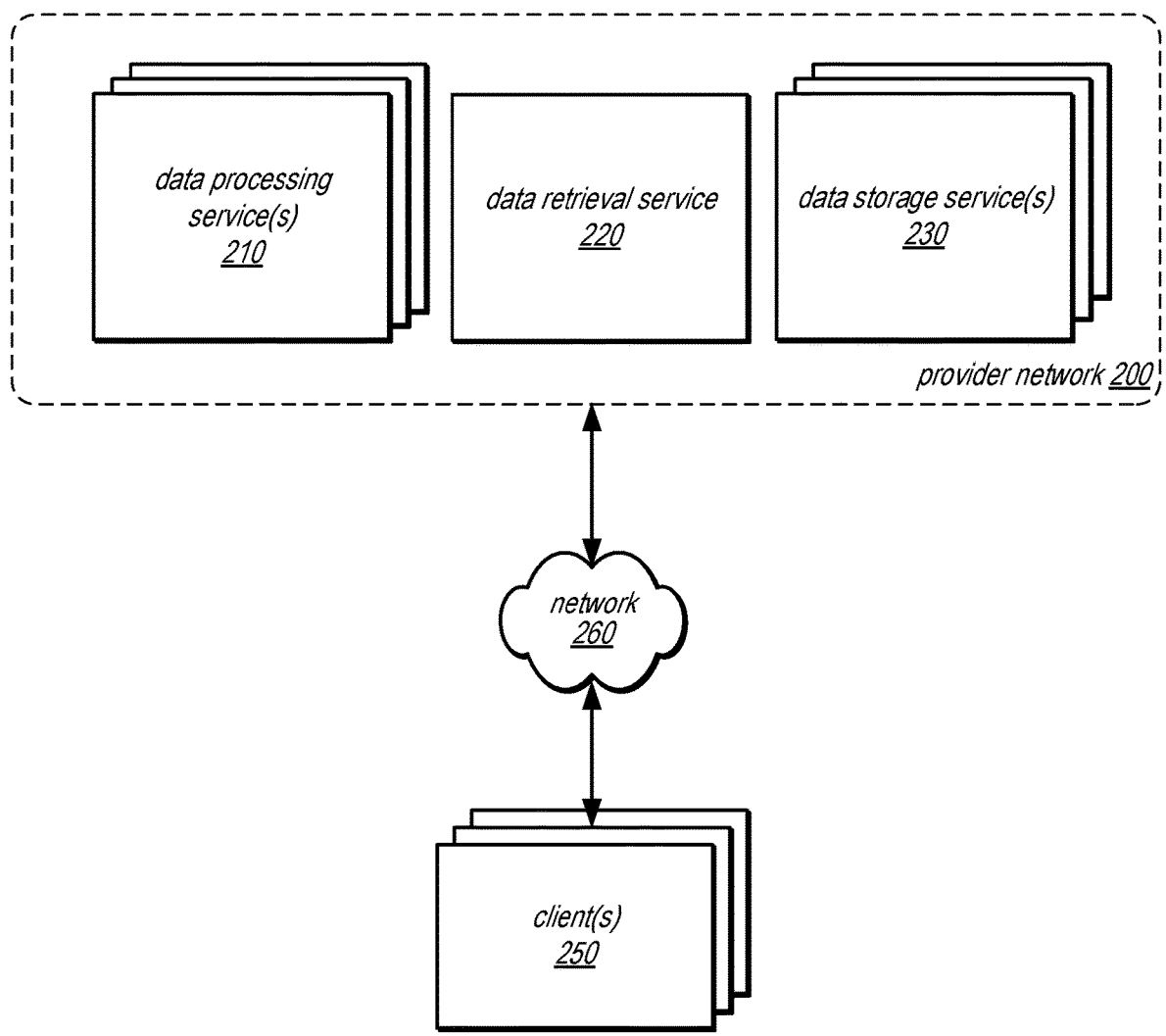
FIG. 2 is a logical block diagram illustrating a provider network offering data processing services that implement dynamically assigning queries to secondary processing resources, according to some embodiments.

FIG. 2 is a logical block diagram illustrating a provider network offering data processing services that implement dynamically assigning queries to secondary processing resources, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 2000 described below with regard to FIG. 14), needed to implement and distribute the infrastructure and storage services offered by the provider network 200. In some embodiments, provider network 200 may implement various computing resources or services, such as data processing service(s) 210, (e.g., a map reduce service, a data warehouse service, and/or other large scale data processing services or database services), data retrieval service 220, and data storage services 230 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 14 and described below. In various embodiments, the functionality of a given system or service component (e.g., a component of data processing service 210, data retrieval service 220, or data storage service 230) may be implemented by a particular node or may be distributed across several nodes. In some embodiments, a given node may implement the functionality of more than one service system component (e.g., more than one data store component).

Data processing services 210 may be various types of data processing services that perform general or specialized data processing functions (e.g., anomaly detection, machine learning, data mining, big data querying, or any other type of data processing operation). For example, in at least some embodiments, data processing services 210 may include a map reduce service that creates clusters of processing nodes that implement map reduce functionality over data stored in the map reduce cluster as well as data stored in one of data storage services 230. In another example, data processing service(s) 210 may include various types of database services (both relational and non-relational) for storing, querying, and updating data. Such services may be enterprise-class database systems that are highly scalable and extensible, such as a database supporting Online Analytics Processing (OLAP) features. Queries may be directed to a database in data processing service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, data processing service(s) 210 may implement, in some embodiments, a data warehouse service, such as discussed below with regard to FIG. 3 that utilizes another data processing service, such as data retrieval service 220, to execute portions of queries or other access requests with respect to data that is stored in a remote data store, such as data storage service(s) 230 (or a data store external to provider network 200) to implement distributed data processing for distributed data sets.

Data retrieval service 220, as discussed in more detail below with regard to FIGS. 3-6, may provide a service supporting many different data or file formats for data stored in a centralized data store, like one (or more) of data storage service(s) 230 including data stored in the file formats supported by data processing service(s) 210.

Instead of reformatting (if the format of data in remote storage is not supported by the data processing service(s) 210) and moving data from data storage service(s) 230 into the data processing service(s) 210, data retrieval service 220 may efficiently read data from data storage service(s) 230 according to the data format in which the data is already stored in data storage service(s) 230. Data retrieval service 220 may perform requested operations, such as scan operations that filter or project data results, aggregation operations that aggregate data values and provide partial or complete aggregation results, sorting, grouping, or limiting operations that organize or reduce the determined data results from data in data storage service(s) 230 in order to minimize the amount of data transferred out of data storage service(s) 230.

For example, data retrieval service 220 may execute different operations that are part of a larger query plan generated at a data processing service 210 and provide results to the data processing service 210 by relying upon requests from data processing service(s) 210 to determine the different operations to perform. In this way, data retrieval service 220 may be implemented as a dynamically scalable and stateless data processing service that is fault tolerant without the need to support complex query planning and execution for multiple different data formats. Instead, data retrieval service 230 may offer a set of data processing capabilities to access data stored in a wide variety of data formats (which may not be supported by different data processing service(s) 210) that can be programmatically initiated on behalf of another data processing client, such as data processing service 210.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds of object or file data stores for putting, updating, and getting data objects or files. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as audio files and web site log files. Data storage service(s) 230 may be accessed via programmatic interfaces (e.g., APIs) or graphical user interfaces. For example, data retrieval service 220 may access data objects stored in data storage services via the programmatic interfaces (as discussed below with regard to FIGS. 5-6).

Generally speaking, clients 250 may encompass any type of client that can submit network-based requests to provider network 200 via network 260, including requests for storage services (e.g., a request to query a data processing service 210, or a request to create, read, write, obtain, or modify data in data storage service(s) 230, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of data processing service(s) 210, data retrieval service 220, or storage resources in data storage service(s) 230 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 250 and the operating system or file system on behalf of applications executing within the operating system environment. Similarly, a client 250 may be an analytics application that relies upon data processing service(s) 210 to execute various queries for data already ingested or stored in the data processing service (e.g., such as data maintained in a data warehouse service, like data warehouse service 300 in FIG. 3 below) or data stored in a data lake hosted in data storage service(s) 230 by performing federated data processing between the data processing service 210 and data retrieval service 220 (as discussed below with regard to FIG. 5).

Clients 250 may convey network-based services requests (e.g., access requests to read or write data may be directed to data in data storage service(s) 230, or operations, tasks, or jobs, such as queries, being performed as part of data processing service(s) 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. In some embodiments, clients of data processing services 210, data retrieval service 220, and/or data storage service(s) 230 may be implemented within provider network 200 (e.g., an application hosted on a virtual computing resource that utilizes a data processing service 210 to perform database queries) to implement various application features or functions and thus various features of client(s) 250 discussed above may be applicable to such internal clients as well.

In at least some embodiments, one of data processing service(s) 220 may be a data warehouse service. FIG. 3 is a logical block diagram of a data warehouse service implementing primary and secondary processing clusters, according to some embodiments. A data warehouse service, such as data warehouse service 300, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as may be equally adapted to implement embodiments for various other types of relational database systems, such as row-oriented database systems. Therefore, the following examples are not intended to be limiting as to various other types or formats of database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Data warehouse service 300 may be implemented by a large collection of computing devices, such as customized or off-the-shelf computing systems, servers, or any other combination of computing systems or devices, such as the various types of systems 2000 described below with regard to FIG. 14. Different subsets of these computing devices may be controlled by control plane 310. Control plane 310, for example, may provide a cluster control interface to clients or users who wish to interact with the processing clusters 320 managed by control plane 310. For example, control plane 310 may generate one or more graphical user interfaces (GUIs) for storage clients, which may then be utilized to select various control functions offered by the control interface for the processing clusters 320 hosted in the data warehouse service 300. Control plane 310 may provide or implement access to various metrics collected for the performance of different features of data warehouse service 300, in some embodiments.

As discussed above, various clients (or customers, organizations, entities, or users) may wish to store and manage data using a data management service. Processing clusters may respond to various requests, including write/update/store requests (e.g., to write data into storage) or queries for data (e.g., such as a Server Query Language request (SQL) for particular data), as discussed below with regard to FIG. 5, along with many other data management or storage services. Multiple users or clients may access a processing cluster to obtain data warehouse services. In at least some embodiments, a data warehouse service 300 may provide network endpoints to the clusters which allow the clients to send requests and other messages directly to a particular cluster. Network endpoints, for example may be a particular network address, such as a URL, which points to a particular cluster. For instance, a client may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Processing clusters, such as processing clusters 320 and 340, hosted by the data warehouse service 300 may provide an enterprise-class database query and management system that allows users to send data processing requests to be executed by the clusters 320, such as by sending a query to a cluster control interface implemented by the network-based service. Processing clusters 320 may perform data processing operations with respect to data stored locally in a processing cluster, as well as remotely stored data. For example, object-based storage service 330 may be a data storage service 230 implemented by provider network 200 that stores remote data, such as backups or other data of a database stored in a cluster. In some embodiments, database data may not be stored locally in a processing cluster 320 but instead may be stored in object-based storage service 330 (e.g., with data being partially or temporarily stored in processing cluster 320 to perform queries). Queries sent to a processing cluster 320 (or routed/redirect/assigned/allocated to processing cluster(s) 340 from processing cluster(s) 320) may be directed to local data stored in the processing cluster and/or remote data. Therefore, processing clusters may implement local data processing, such as local data processing 322 and 342, (discussed below with regard to FIGS. 5 and 6) to plan and execute the performance of queries with respect to local data in the processing cluster, as well as a remote data processing client, such as remote data processing clients 324 and 344, to direct execution of different sub-queries (e.g., operations determined as part of the query plan generated at the processing cluster 320) that are assigned to data retrieval service 220 with respect to processing remote database data 332).

In some embodiments, data warehouse service 300 may implement primary clusters 330 and secondary cluster pool 350. Primary clusters 330 may be reserved, allocated, permanent, or otherwise dedicated processing resources that store and/or provide access to a database for a client of data warehouse service 300, in some embodiments. Secondary cluster pool 350 may be a set of warmed, pre-configured, initialized, or otherwise prepared clusters which may be on standby to provide additional query performance capacity for a primary cluster 330. Control plane 310 may manage secondary cluster pool 350 by managing the size of secondary cluster pool 350 (e.g., by adding or removing processing clusters 340 based on demand). Control plane 310 may determine the capabilities or configuration (which may be different) of processing cluster(s) 340 in secondary cluster pool 350 (e.g., maintaining a number of 10 node clusters, 15 node clusters, 20 node clusters, etc.). Processing clusters 340 in secondary cluster pool 350 may be obtained or provisioned for a primary cluster 330, as discussed in detail below with regard to FIG. 8.

As databases are created, updated, and/or otherwise modified, snapshots, copies, or other replicas of the database at different states may be stored separate from data warehouse service 300 in object-based storage service 330, in some embodiments. For example, a leader node, or other processing cluster component, may implement a backup agent or system that creates and store database backups for a database to be stored as database data 332 in object-based storage service 330. Database data 332 may include user data (e.g., tables, rows, column values, etc.) and database metadata (e.g., information describing the tables which may be used to perform queries to a database, such as schema information, data distribution, range values or other content descriptors for filtering out portions of a table from a query, etc.). A timestamp or other sequence value indicating the version of database data 332 may be maintained in some embodiments, so that the latest database data 332 may, for instance, be obtained by a processing cluster in order to perform queries sent for secondary query performance.

Figure 4:
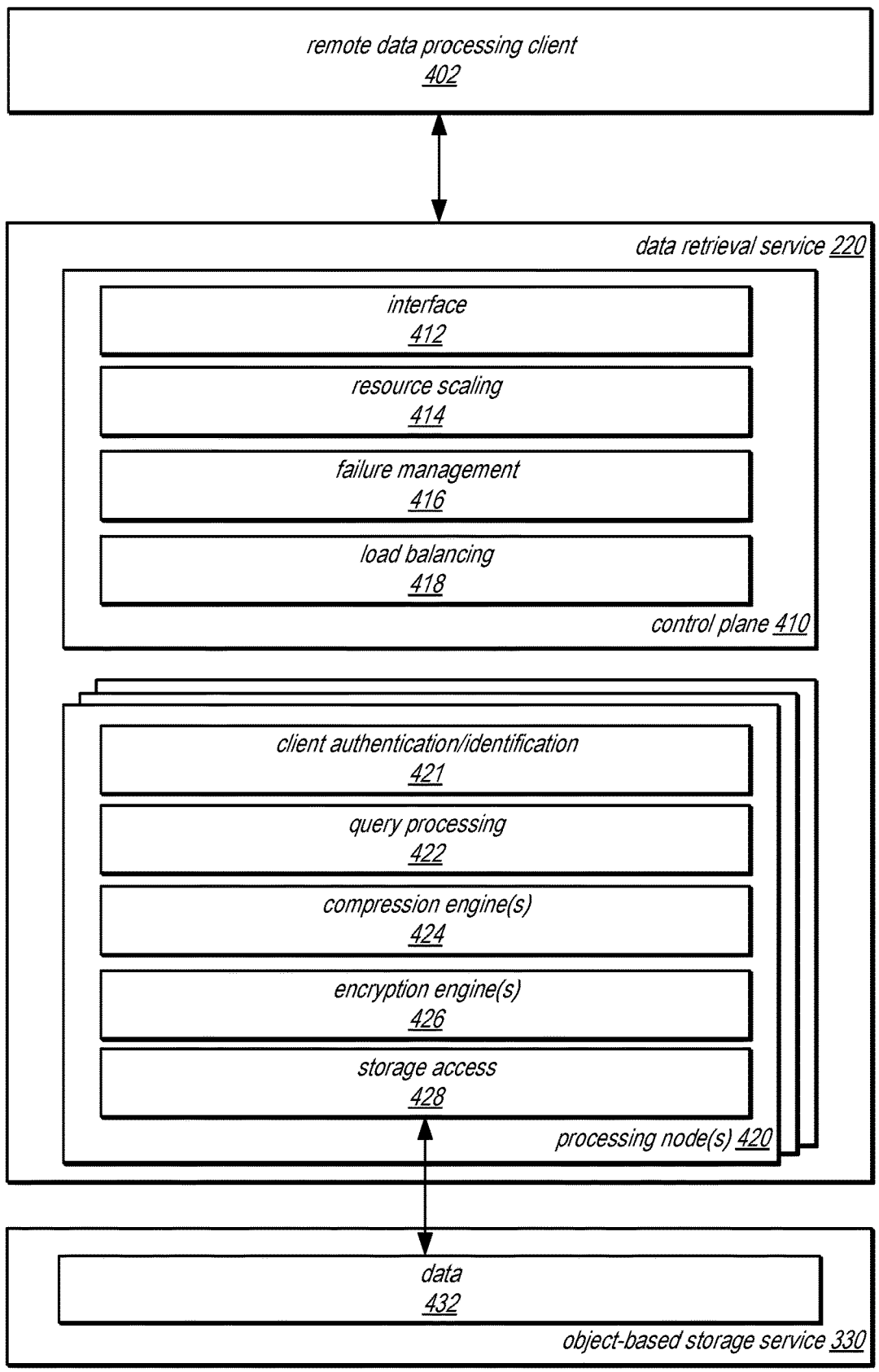
FIG. 4 is a logical block diagram illustrating a data retrieval service, according to some embodiments.

FIG. 4 is a logical block diagram illustrating a data retrieval service, according to some embodiments. As noted above in FIG. 2, data retrieval service 220 may receive requests to perform processing operations with respect to data stored 432 stored in a data storage service (e.g., backup data or other database data, such as other database tables or data that is not stored according to a format, schema, or structure like that of data stored in data warehouse service 300). Processing requests may be received from a client, such as remote data processing client(s) 402 (which may another data processing service 210, like data warehouse service 300 or another data processing client, such as a database engine/cluster or map reduce cluster implemented outside of provider network 200 and communicating with data retrieval service 220 in order to process queries with respect to data stored within provider network 200 in a data storage service 230 or to process data stored outside of provider network 200 (when the data is made accessible to data retrieval service 220).

Data retrieval service 220 may implement a control plane 410 and multiple processing node(s) 420 to execute processing requests received from remote data processing client(s) 402. Control plane 410 may arbitrate, balance, select, or dispatch requests to different processing node(s) 420 in various embodiments. For example, control plane 410 may implement interface 412 which may be a programmatic interface, such as an application programming interface (API), that allows for requests to be formatted according to the interface 412 to programmatically invoke operations. In some embodiments, the API may be defined to allow operation requests defined as objects of code generated at and sent from remote data processing client(s) 402 (based on a query plan generated at remote data processing client(s) 402) to be compiled or executed in order to perform the assigned operations at data retrieval service 220.

In some embodiments, data retrieval service 220 may implement load balancing 418 to distribute remote processing requests across different processing node(s) 420. For example, a remote processing request received via interface 412 may be directed to a network endpoint for a load-balancing component of load balancing 418 (e.g., a load balancing server or node) which may then dispatch the request to one of processing node(s) 420 according to a load balancing scheme. A round-robin load balancing, for instance, may be used to ensure that remote data processing requests are fairly distributed amongst processing node(s) 420. However, various other load-balancing schemes may be implemented. As data retrieval service 220 may receive many remote data processing requests from multiple remote data processing client(s) 402, load balancing 418 may ensure that incoming requests are not directed to busy or overloaded processing node(s) 420.

Data retrieval service 220 may also implement resource scaling 414. Resource scaling 414 may detect when the current request rate or workload upon a current number of processing node(s) 420 exceeds or falls below over-utilization or under-utilization thresholds for processing nodes. In response to detecting that the request rate or workload exceeds an over-utilized threshold, for example, then resources scaling 414 may provision, spin up, activate, repurpose, reallocate, or otherwise obtain additional processing node(s) 420 to processing received remote data processing requests. Similarly, the number of processing node(s) 420 could be reduced by resource scaling 414 in the event that the request rate or workload of processing node(s) falls below the under-utilization threshold.

Data retrieval service 220 may also implement failure management 416 to monitor processing node(s) 420 and other components of data retrieval service 220 for failure or other health or performance states that may need to be repaired or replaced. For example, failure management 416 may detect when a processing node fails or becomes unavailable (e.g., due to a network partition) by polling processing node(s) 420 to obtain health or performance status information. Failure management may initiate shutdown or halting of processing at failing processing node(s) 420 and provision replacement processing node(s) 420.

Figure 14:
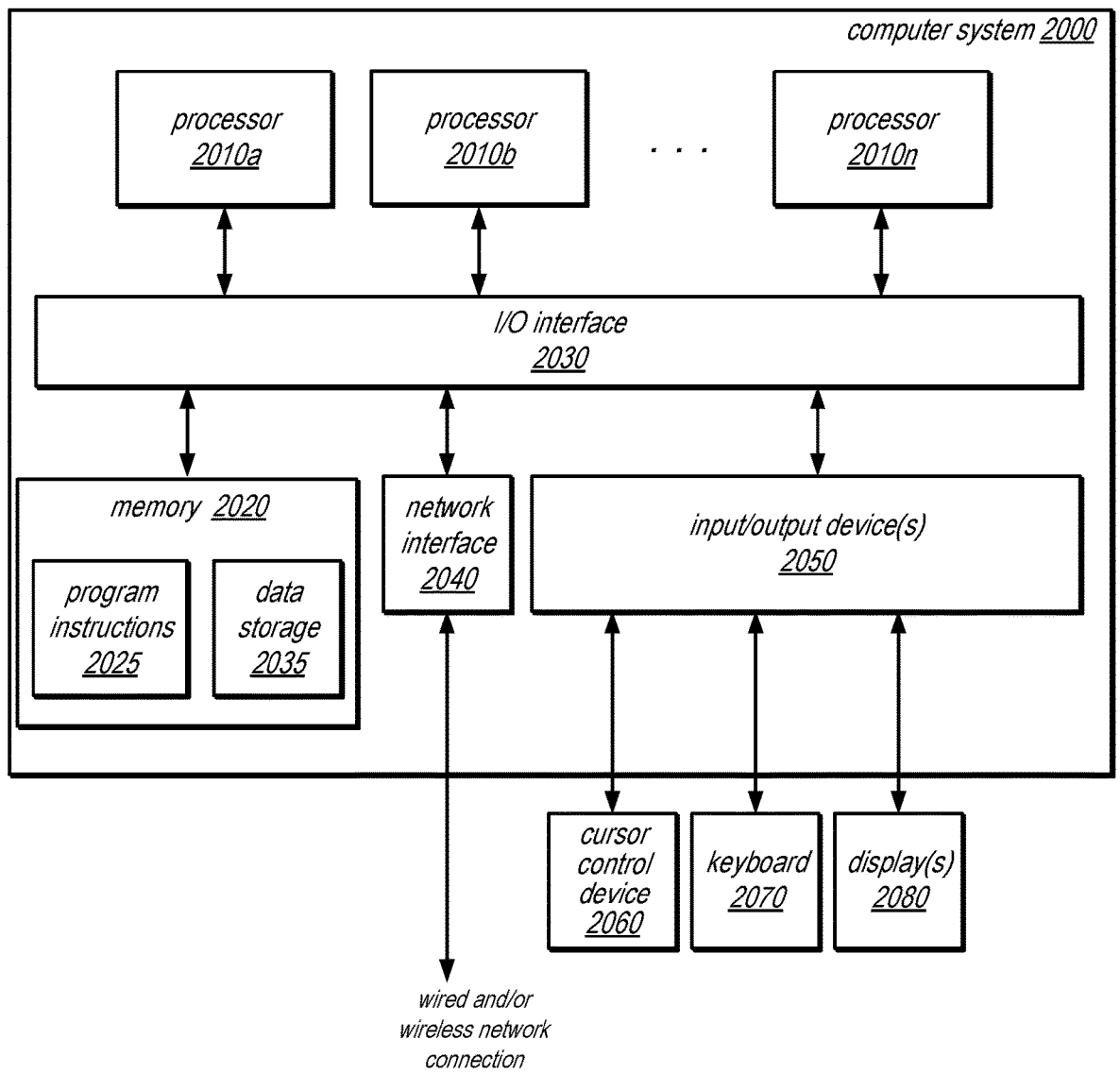
FIG. 14 illustrates an example system that implements the various methods, techniques, and systems described herein, according to some embodiments.

Processing node(s) 420 may be implemented as separate computing nodes, servers, or devices, such as computing systems 2000 in FIG. 14, to perform data processing operations on behalf of remote data processing client(s) 402. Processing node(s) 420 may implement stateless, in-memory processing to execute processing operations, in some embodiments. In this way, processing node(s) 420 may have fast data processing rates. Processing node(s) 420 may implement client authentication/identification 421 to determine whether a remote data processing client 402 has the right to access data 432 in storage service 430. For example, client authentication/identification 421 may evaluate access credentials, such as a username and password, token, or other identity indicator by attempting to connect with storage service 430 using the provided access credentials. If the connection attempt is unsuccessful, then the data processing node 402 may send an error indication to remote data processing client 402.

Processing node(s) 420 may implement query processing 422 or other features of a query engine which may perform multiple different sub-queries (e.g., processing operations) and support multiple different data formats. For example, query processing 422 may implement separate tuple scanners for each data format which may be used to perform scan operations that scan data 432 and which may filter or project from the scanned data, search (e.g., using a regular expression) or sort (e.g., using a defined sort order) the scanned data, aggregate values in the scanned data (e.g., count, minimum value, maximum value, and summation), and/or group by or limit results in the scanned data. Remote data processing requests may include an indication of the data format for data 432 so that query processing 422 may use the corresponding tuple scanner for data 432. Query processing 422 may, in some embodiments, transform results of operations into a different data format or schema according to a specified output data format in the remote data processing request.

In some embodiments, data 432 may be stored in encrypted or compressed format. Processing node(s) 420 may implement compression engine(s) 424 to decompress data 432 according to a compression technique identified for data 432, such as lossless compression techniques like run-length encoding, Lempel-Ziv based encoding, or bzip based encoding. Processing node(s) 420 may implement encryption engine(s) 426 to decrypt data 432 according to an encryption technique and/or encryption credential, such as a key, identified for data 432, such as symmetric key or public-private key encryption techniques.

Processing node(s) 420 may implement storage access 428 to format, generate, send and receive requests to access data 432 in storage service 430. For example, storage access 428 may generate requests to obtain data according to a programmatic interface for storage service 430. In some embodiments, other storage access protocols, such as internet small computer interface (iSCSI), may be implemented to access data 432.

Figure 5:
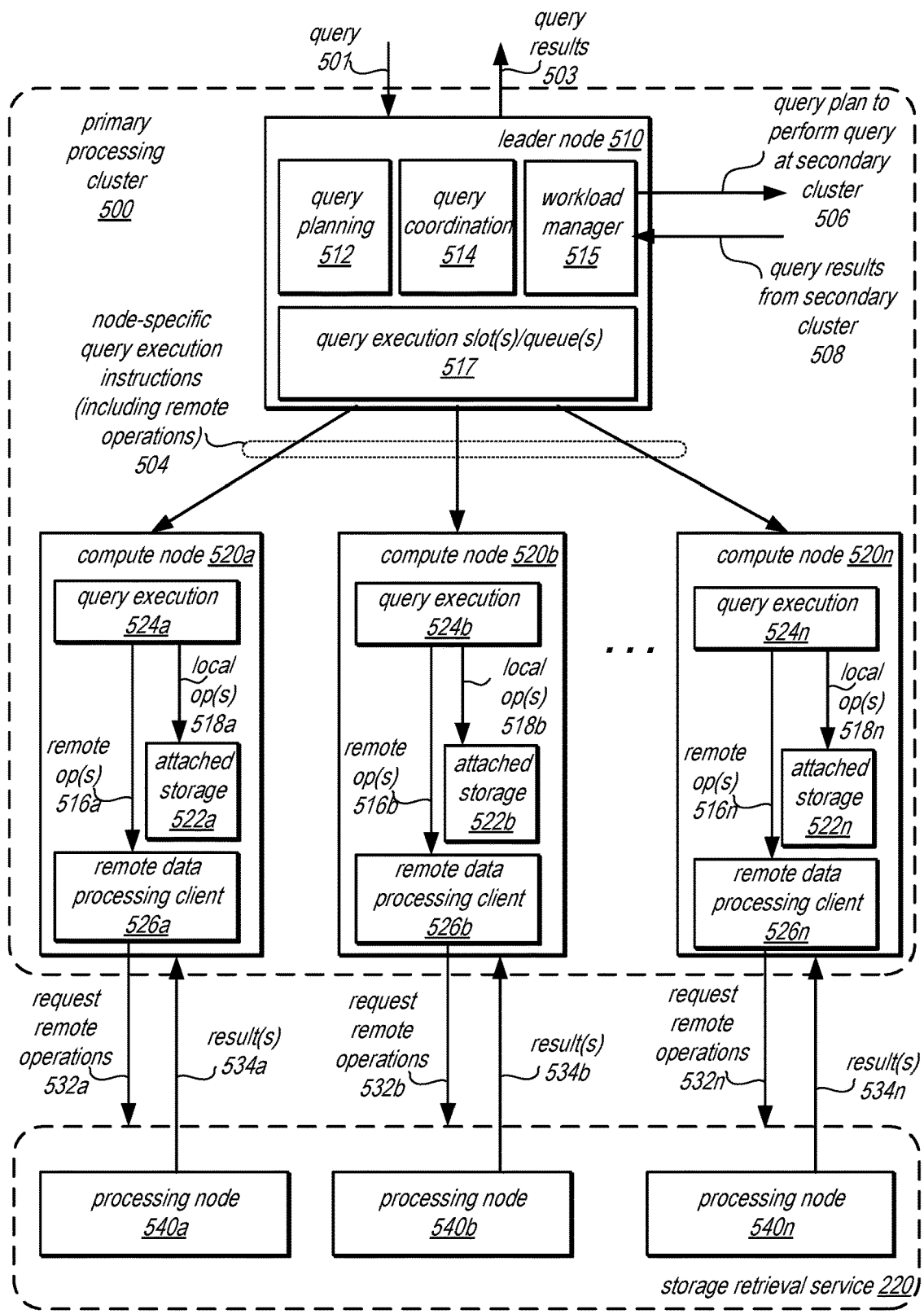
FIG. 5 is a logical block diagram illustrating an example primary processing cluster of a data warehouse service that implements dynamically assigning queries to secondary processing clusters, according to some embodiments.

FIG. 5 is a logical block diagram illustrating an example primary processing cluster of a data warehouse service that implements dynamically assigning queries to secondary processing clusters, according to some embodiments. Primary processing cluster 500 may be data warehouse service cluster, like processing clusters 320 discussed above with regard to FIG. 3, or another processing cluster that distributes execution of a query among multiple processing nodes. As illustrated in this example, a primary processing cluster 500 may include a leader node 510 and compute nodes 520a, 520b, and 520n, which may communicate with each other over an interconnect (not illustrated). Leader node 510 may implement query planning 512 to generate query plan(s), query execution 514 for executing queries on primary processing cluster 500 that perform data processing that can utilize remote query processing resources for remotely stored data (e.g., by utilizing one or more query execution slot(s)/queue(s) 517) and workload manager 515 for selecting, routing, directing, or otherwise causing a received query to be performed using secondary capacity resources, such as a secondary processing cluster 600 in FIG. 6 discussed below. As described herein, each node in a primary processing cluster 500 may include attached storage, such as attached storage 522*a*, 522*b*, and 522*n*, on which a database (or portions thereof) may be stored on behalf of clients (e.g., users, client applications, and/or storage service subscribers).

Note that in at least some embodiments, query processing capability may be separated from compute nodes, and thus in some embodiments, additional components may be implemented for processing queries. Additionally, it may be that in some embodiments, no one node in processing cluster 500 is a leader node as illustrated in FIG. 5, but rather different nodes of the nodes in processing cluster 500 may act as a leader node or otherwise direct processing of queries to data stored in processing cluster 500. While nodes of processing cluster may be implemented on separate systems or devices, in at least some embodiments, some or all of processing cluster may be implemented as separate virtual nodes or instance on the same underlying hardware system (e.g., on a same server).

In at least some embodiments, primary processing cluster 500 may be implemented as part of a data warehouse service, as discussed above with regard to FIG. 3, or another one of data processing service(s) 210. Leader node 510 may manage communications with clients, such as clients 250 discussed above with regard to FIG. 2. For example, leader node 510 may be a server that receives a query 501 from various client programs (e.g., applications) and/or subscribers (users), then parses them and develops an execution plan (e.g., query plan(s)) to carry out the associated database operation(s)). More specifically, leader node 510 may develop the series of steps necessary to obtain results for the query. Query 501 may be directed to data that is stored both locally within processing cluster 500 (e.g., at one or more of compute nodes 520) and data stored remotely (which may be accessible by data retrieval service 220). Leader node 510 may also manage the communications among compute nodes 520 instructed to carry out database operations for data stored in the processing cluster 500. For example, node-specific query instructions 504 may be generated or compiled code by query execution 514 that is distributed by leader node 510 to various ones of the compute nodes 520 to carry out the steps needed to perform query 501, including executing the code to generate intermediate results of query 501 at individual compute nodes may be sent back to the leader node 510. Leader node 510 may receive data and query responses or results from compute nodes 520 in order to determine a final result 503 for query 501. A database schema, data format and/or other metadata information for the data stored among the compute nodes, such as the data tables stored in the cluster, may be managed and stored by leader node 510. Query planning 512 may account for remotely stored data by generating node-specific query instructions that include remote operations to be directed by individual compute node(s). As discussed in more detail below with regard to FIG. 7, a leader node may implement workload manager 515 to send 506 a query plan generated by query planning 512 to be performed at a secondary processing cluster and return results 508 received from the secondary processing cluster to a client as part of results 503. In this way, secondary query processing may occur without client application changes to establish a separate connection or communication scheme with secondary processing resources, allowing for seamless scaling between primary and secondary processing capacity.

Processing cluster 500 may also include compute nodes, such as compute nodes 520*a*, 520*b*, and 520*n*. Compute nodes 520, may for example, be implemented on servers or other computing devices, such as those described below with regard to computer system 2000 in FIG. 14, and each may include individual query processing "slices" defined, for example, for each core of a server's multi-core processor, one or more query processing engine(s), such as query engine(s) 524*a*, 524*b*, and 524*n*, to execute the instructions 504 or otherwise perform the portions of the query plan assigned to the compute node. Query engine(s) 524 may access a certain memory and disk space in order to process a portion of the workload for a query (or other database operation) that is sent to one or more of the compute nodes 520. Query engine 524 may access attached storage, such as 522*a*, 522*b*, and 522*n*, to perform local operation(s), such as local operations 518*a*, 518*b*, and 518*n*. For example, query engine 524 may scan data in attached storage 522, access indexes, perform joins, semi joins, aggregations, or any other processing operation assigned to the compute node 520.

Query engine 524*a* may also direct the execution of remote data processing operations, by providing remote operation(s), such as remote operations 516*a*, 516*b*, and 516*n*, to remote data processing clients, such as remote data processing client 526*a*, 526*b*, and 526*n*. Remote data processing clients 526 may be implemented by a client library, plugin, driver or other component that sends request sub-queries, such as sub-quer(ies) 532*a*, 532*b*, and 532*n* to data retrieval service 220. As noted above, in some embodiments, data retrieval service 220 may implement a common network endpoint to which request sub-quer(ies) 532 are directed, and then may dispatch the requests to respective processing nodes, such as processing nodes 540*a*, 540*b*, and 540*n*. Remote data processing clients 526 may read, process, or otherwise obtain results from processing nodes, including partial results of different operations (e.g., aggregation operations) and may provide sub-query result(s), including result(s) 534*a*, 534*b*, and 534*c*, back to query engine(s) 524, which may further process, combine, and or include them with results of location operations 518.

Compute nodes 520 may send intermediate results from queries back to leader node 510 for final result generation (e.g., combining, aggregating, modifying, joining, etc.). Remote data processing clients 526 may retry remote operation request(s) 532 that do not return within a retry threshold. As data retrieval service 220 may be stateless, processing operation failures at processing node(s) 540 may not be recovered or taken over by other processing nodes 540, remote data processing clients 526 may track the success or failure of requested operation(s) 532, and perform retries when needed.

Attached storage 522 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 6:
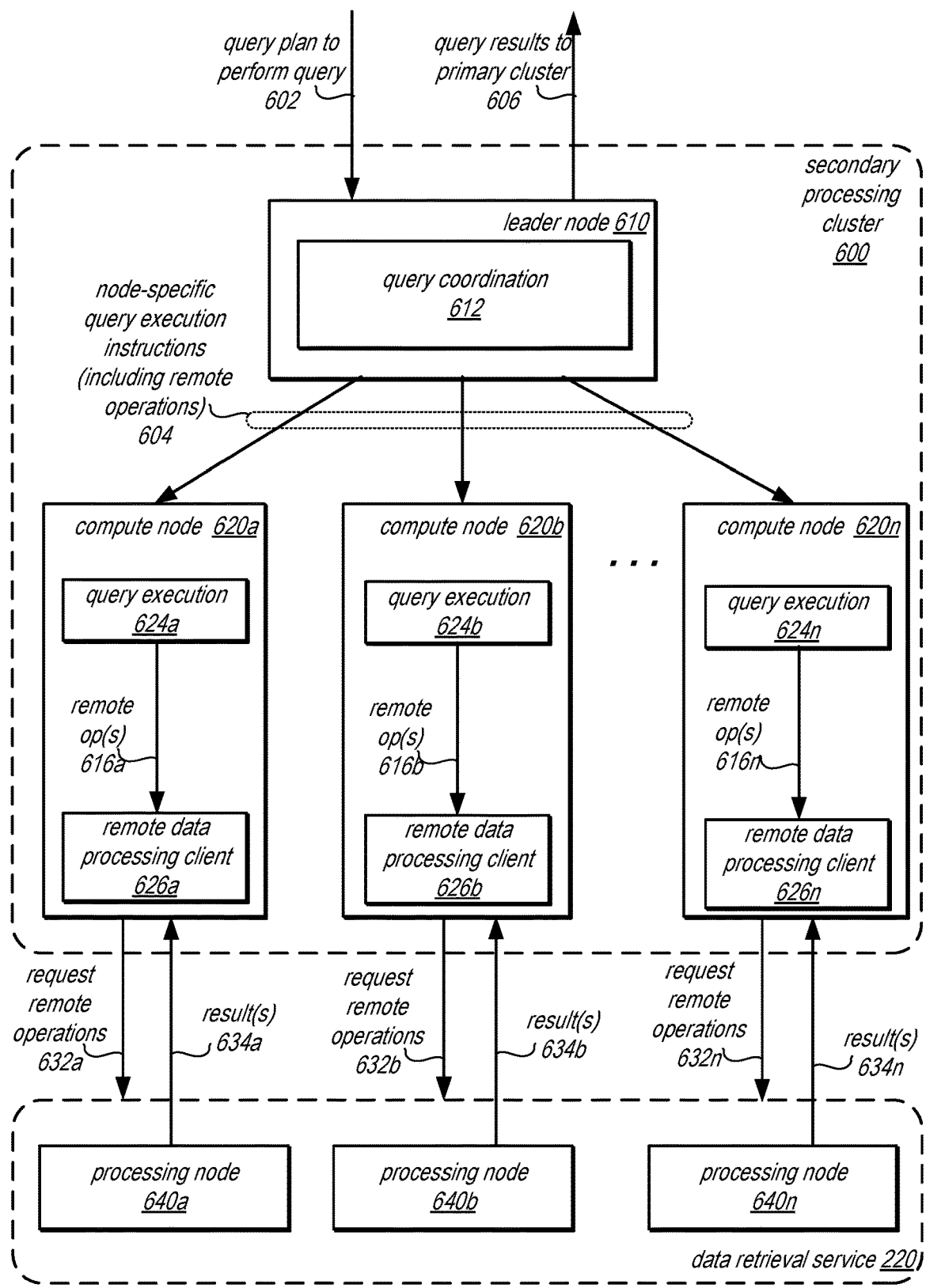
FIG. 6 is a logical block diagram illustrating an example secondary processing cluster of a data warehouse service, according to some embodiments.

FIG. 6 is a logical block diagram illustrating an example secondary processing cluster of a data warehouse service, according to some embodiments. Similar to primary processing cluster 500 in FIG. 5, secondary processing cluster 600 may include a leader node 610 and compute nodes 620*a*, 620*b*, and 620*n*, which may communicate with each other over an interconnect (not illustrated). Leader node 610 may implement query execution 612 for executing queries on secondary processing cluster 600. For example, leader node 610 may receive a query plan 602 to perform a query from a primary processing cluster. Query execution 612 may generate the instructions or compile code to perform the query according to the query plan. Leader node 610 may also manage the communications among compute nodes 620 instructed to carry out database operations for data stored in the secondary processing cluster 600. For example, node-specific query instructions 604 may be generated or compiled code by query execution 612 that is distributed by leader node 610 to various ones of the compute nodes 620 to carry out the steps needed to perform query plan 602, including executing the code to generate intermediate results of the query at individual compute nodes may be sent back to the leader node 610. Leader node 610 may receive data and query responses or results from compute nodes 620 in order to determine a final result 606 for the query to be sent back to the primary processing cluster.

In at least some embodiments, secondary processing cluster 600 may not maintain a local copy of the database, but instead may access a backup of the database (or the database directly which may not be maintained locally at primary processing clusters) via data retrieval service 220. For example, query engine 624*a* may direct the execution of remote data processing operations, by providing remote operation(s), such as remote operations 616*a*, 616*b*, and 616*n*, to remote data processing clients, such as remote data processing client 626*a*, 626*b*, and 626*n*, in order to retrieve data from the database data in object storage service 330 to perform the query. As noted earlier, remote data processing clients 626 may be implemented by a client library, plugin, driver or other component that sends request sub-queries, such as sub-quer(ies) 632*a*, 632*b*, and 632*n* to data retrieval service 220. As noted above, in some embodiments, data retrieval service 220 may implement a common network endpoint to which request sub-quer(ies) 632 are directed, and then may dispatch the requests to respective processing nodes, such as processing nodes 640*a*, 640*b*, and 640*n*. Remote data processing clients 626 may read, process, or otherwise obtain results from processing nodes, including partial results of different operations (e.g., aggregation operations) and may provide sub-query result(s), including result(s) 634*a*, 634*b*, and 634*c*, back to query engine(s) 624, which may further process, combine, and or include them with results of location operations 618. In at least some embodiments, processing nodes 640 may filter, aggregate, or otherwise reduce or modify data from the database backups used to perform the query in order to lessen the data transferred and handled by secondary processing cluster 600, increasing the performance of the query at secondary processing cluster 600. Although not illustrated in FIG. 6, some secondary processing clusters may implement local attached storage and local processing similar to primary processing cluster 500 in FIG. 5. For example, a secondary processing cluster that was scheduled for a period of time that exceeds some threshold value (e.g., greater than 1 hour) may read and store in persistent storage database data from the database data (e.g., directly or via data retrieval service 220), in some embodiments.

Although not illustrated in FIGS. 5 and 6, further communications between a primary processing cluster and secondary processing cluster may be implemented. For example, database metadata may be obtained at secondary processing cluster 600 from a database backup and then updated as updates are made at the primary processing cluster, in some embodiments, as discussed below with regard to FIG. 8. In some embodiments, compute nodes 620 (or leader node 610) may request data directly from compute nodes 520 in primary processing cluster 500), such as updated data blocks in a table of a database. In at least one embodiment, all of the data used to perform a query may be obtained by compute nodes 620 from compute nodes 520 instead of utilizing data retrieval service 220 and a backup in a separate data store.

In at least some embodiments, secondary processing cluster 600 may be a single tenant resource, only performing secondary queries for one database (or client or user account). In some embodiments, secondary processing cluster 600 may be a multi-tenant environment, handling secondary queries for different databases, different user accounts and/or different clients. In such scenarios, security techniques to prevent data from being visible to unauthorized users may be implemented.

Figure 7:
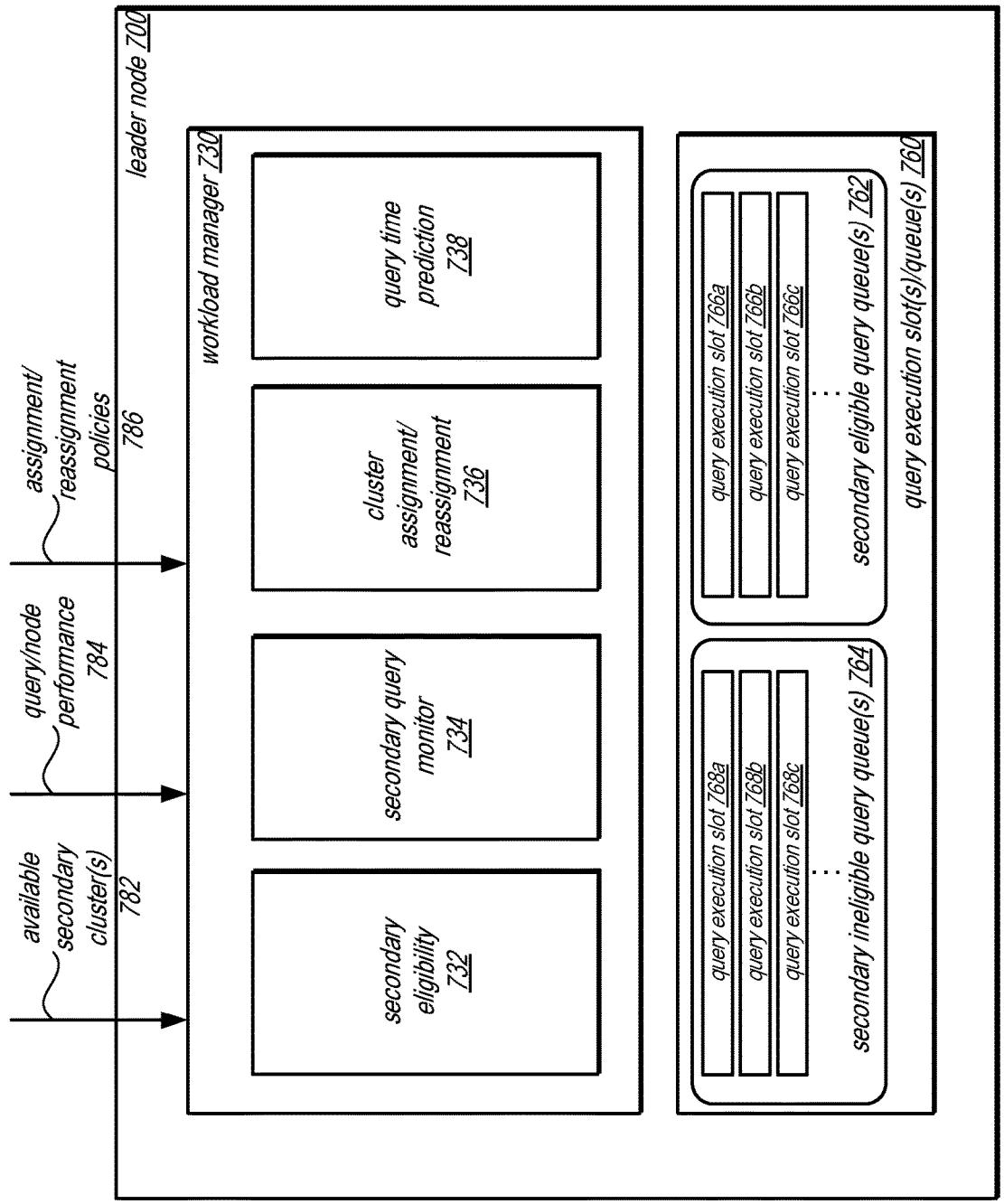
FIG. 7 is a logical block diagram illustrating an example of workload manager that implements dynamically assigning queries to secondary processing resources, according to some embodiments.

FIG. 7 is a logical block diagram illustrating an example of workload management that implements dynamically assigning queries to secondary processing resources, according to some embodiments. Leader node 700 may be similar to leader node 510 in FIG. 5. Leader node 700 may implement workload manager 730 to perform dynamic assignments of queries, in some embodiments.

As illustrated in FIG. 5, workload manager 730 may be implemented by leader node to assign the cluster to perform database query, in some embodiments. For example, workload manager 730 may implement secondary eligibility 732, which may determine whether a received query is eligible to perform at a secondary query processing resource according to the techniques discussed below with regard to FIG. 9.

In some embodiments, workload manager 703 may implement query time prediction 738, which may apply one or more size classifiers to the query plan in order to classify a size that indicates an expected/predicted execution time of the query, (e.g., "small/short," "medium," or "large/long" queries). For instance, a rules-based decision engines for classifying the size of a query may be applied (e.g., which may apply different rules to features of the query, such as the size of the table being queried, the type of operations (e.g., joins and/or scans), the source of the query (e.g., which client application or user account, by checking to see if the query has been performed before and how long it performed, number of storage locations accessed, types of queries that cannot by definition be "small" or "medium", etc.). In some embodiments, query size classifier(s) may be trained using machine learning techniques so that when a size classifier 740 is applied to features of the plan, a probability indicative of a size of the database query may be generated, in some embodiments. For example, a linear classifier may be applied to score the features of the query plan according to a weighted sum of the features (e.g., by applying coefficients to the features determined from training the classifier according to logistic regression). In some embodiments, other features in addition to the query plan may be considered, such as the source of the query (e.g., what user submitted the query), time of day, what table(s) are identified in the query, among others. The size classifiers may be trained to specific query engines, in some embodiments. In this way, the varying configurations of secondary query processing clusters, for instance, may be considered which may alter query performance when classifying a query's size.

The output of the classifiers may be a probability value, in various embodiments. The probability value may be compared to a classification threshold, in some embodiments. For example, if the greater the probability value indicates the longer a query is likely to run and thus a greater size, then ranges of probabilities may correspond to different sizes at different clusters (e.g., "small-secondary," "small-primary," "medium-secondary," "medium-primary," "large-secondary," or "large-primary" queries), in some embodiments. In some embodiments, separate size classifiers, such as a classifier for small queries, a classifier for medium queries, and a classifier for large queries may be applied to select as the size the classification with the highest confidence score.

Workload manager may implement cluster assignment/reassignment 736, which may perform various ones of the techniques discussed below with regard to FIGS. 9-13, in some embodiments. For example, cluster assignment/reassignment 736 may apply different criteria or other thresholds according to the size classification (e.g., a "medium" query is greater than a threshold that applies rules for "small" queries), in some embodiments. As discussed in detail below with regard to FIGS. 9-13, the user, workload, allocation, or otherwise state of the primary processing cluster as indicated by queue/slot state which may be provided and used to make cluster selections. For example, query execution slot(s)/queue(s) 760 may be maintained as part of leader node 700, in some embodiments. Query execution slot(s)/queue(s) 760 may, in some embodiments, be implemented as part of a queue (not illustrated). A query execution slot, such as query execution slots 766a, 766b, 766c, 768a, 768b, and 768c, may identify a process that is allocated a certain portion of computing resources at a processing cluster (e.g., processor, memory, I/O bandwidth, network bandwidth, etc.) to perform a query assigned to that slot. As illustrated in FIG. 7, some query execution slots may be allocated for secondary query engine ineligible queries 764 for queries. Other slots, such as slots 762, may be available for secondary eligible queries, in some embodiments.

Cluster assignment/reassignment 736 may receive information indicating available secondary cluster(s) 782 for assignment or reassignment of queries. Cluster assignment/reassignment 736 may direct the query for local query execution, in some embodiments. Alternatively, cluster assignment/reassignment 736 may select a secondary processing cluster to perform the query, and provide a request, instruction, or other indication to perform secondary query execution, in some embodiments. In at least some embodiments, further query planning to adapt the query plan to the secondary cluster may be performed (not illustrated). For example, the number of nodes in the secondary processing cluster may be different, which may result in a different division of work in the query plan. Instructions may also be included for accessing data through data retrieval service 220 (e.g., storage object locations, access credentials, including specialized operators or instructions to leverage data retrieval service 220 in the plan), in some embodiments.

Workload manager 730 may implement secondary query monitor 734, which may perform various techniques to manage or observe queries at secondary processing clusters. Remote query node performance 784 may be received to determine whether query is still executing or performing remotely. If not, secondary query monitory 734 may send a request to cluster assignment/reassignment to change the assignment of the query to local execution. For example, as discussed below with regard to FIG. 12B, in some circumstances a query may be preempted by another query or exceed expected performance criteria.

In at least some embodiments, workload manager 730 may be configured via user and/or control plane requests. For example, assignment/reassignment policies 786 may be received, created, deleted, or modified, in some embodiments. In at least some embodiments, assignment/reassignment policies 786 may allow users (or the control) to specify via an interface when secondary performance of queries may be enabled or disabled for a primary processing cluster. For example, secondary can be enabled/disabled automatically in order to optimize for cost or performance, in some embodiments. A maximum queue time or other performance criteria for the primary processing cluster could be specified as part of assignment/reassignment policies 780 for queries, for instance, may determine when secondary processing should occur (e.g., if queries would exceed the queue time then begin using bust capacity). In some embodiments, a secondary budget (e.g., a cost limitation for using secondary processing clusters) or other limitation may be specified as part of assignment/reassignment policies 780 in order to allow a user/client application to indicate when secondary should stop so that the budget or other limitation is not exceeded (e.g., for a given time period, such as a day, week, month, etc.).

Figure 8:
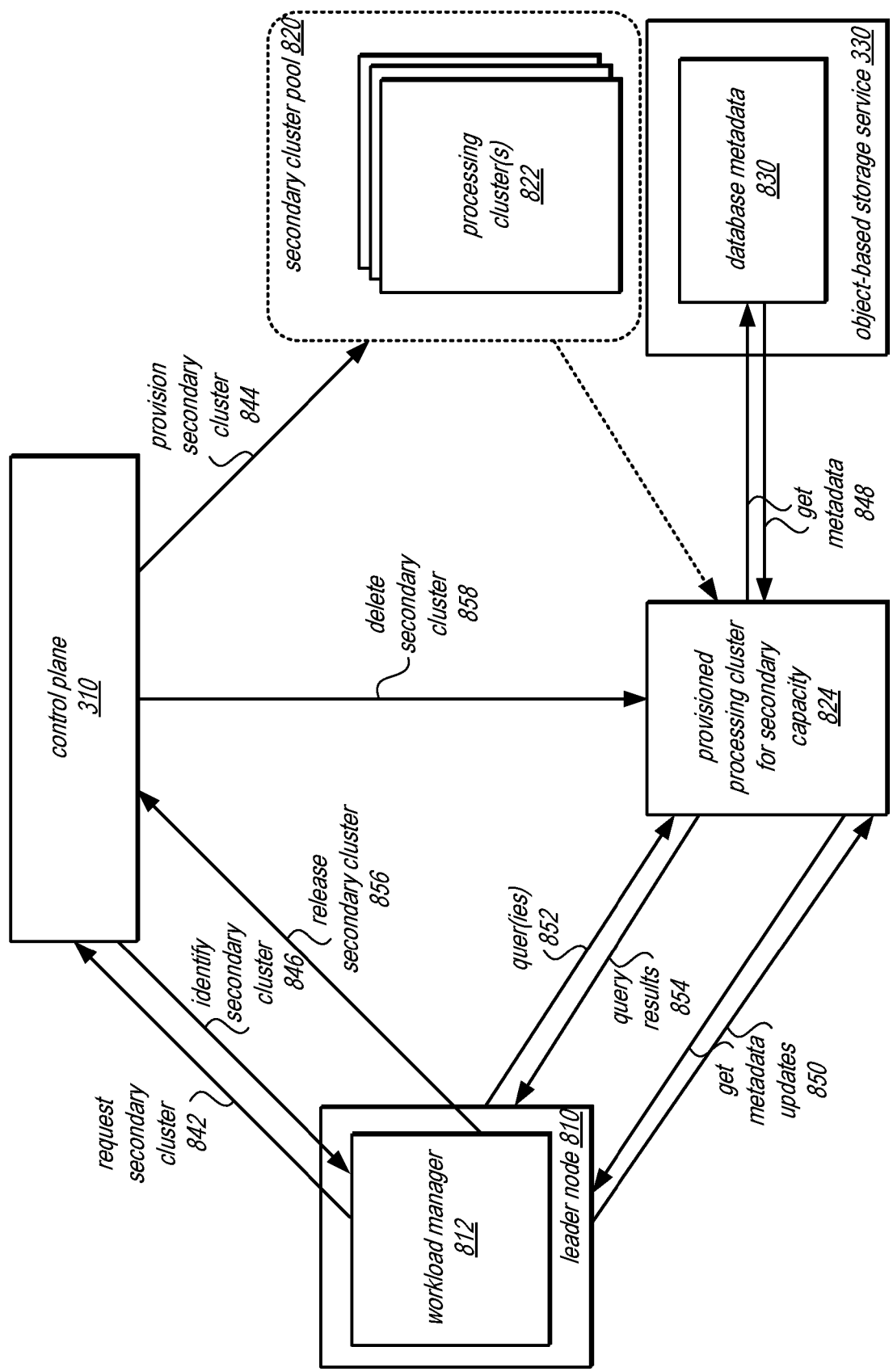
FIG. 8 is a logical block diagram illustrating example interactions to obtain and release a secondary processing cluster from a pool of secondary processing clusters, according to some embodiments.

FIG. 8 is a logical block diagram illustrating example interactions to obtain and release a secondary processing cluster from a pool of secondary processing clusters, according to some embodiments. Workload manager 812 at leader node 810 may detect or determine when to obtain a secondary cluster for performing queries in various scenarios, as discussed above with regard to workload manager 730 in FIG. 7 and below with regard to FIGS. 9-13. Workload manager 812 may then request a secondary cluster 842 from control plane 310. The request may, in some embodiments, specify a type of secondary cluster. In some embodiments, control plane 310 may evaluate a manifest, index, or other data that describes available processing cluster(s) 822 in secondary cluster pool 820 in order to satisfy the request. For example, control plane 310 may identify a processing cluster that matches (or best matches) the specified configuration of the secondary cluster request, in some embodiments. In some embodiments, control plane 310 may identify a secondary cluster that was previously used for performing queries to the database hosted by the cluster of leader node 810.

Control plane 310 may provision 844 the secondary cluster, in some embodiments, from secondary cluster pool, such as provisioned secondary cluster 824. Provisioning a secondary cluster may include various operations to configure network connections between provisioned processing cluster for secondary capacity 824 and leader node 810 and other services (e.g., data retrieval service 220, object storage service 330, etc.). In some embodiments, access credentials, security tokens, and/or encryption keys may be provided so that provisioned processing cluster for secondary capacity 824 can access and database data to perform queries for the database. In some embodiments, initialization procedures, workflows or other operations may be started by control plane 310 at provisioned processing cluster for secondary capacity 824. For example, provisioned processing cluster for secondary capacity 824 may get metadata 848 from object-based storage service 330 that is stored as part of database metadata 830 in a database backup in order to perform queries to the database. In some embodiments, provisioned processing cluster for secondary capacity 824 may get metadata updates 850 directly from leader node 810 (or other nodes in a primary processing cluster) in order to catch up the metadata to account for changes that occurred after the backup was stored.

Once provisioning is complete, provisioned processing cluster for secondary capacity 824 may be made available for performing queries. Control plane 310 may identify the secondary cluster 846 to leader node 810 (e.g., by providing a network endpoint for provisioned cluster 824), in some embodiments. Leader node 810 may then begin directing selected queries 852 to provisioned cluster 824, which may perform the queries and send back query results 854 to leader node 810, which may provide the results to a client in turn. In this way, a client application does not have to learn of and receive requests from a second location, provisioned cluster 824 when secondary performance is used, in some embodiments. Workload manager 812 may request different types, sizes, or other configurations of secondary clusters to, for instance, compare performance of queries.

When an event that triggering release of the secondary cluster occurs, workload manager 812 may send a request to control plane 310 to release the secondary cluster 856 (e.g., by including the identifier of the provisioned cluster 824). Control plane 310 may then delete the secondary cluster 858 (e.g., by removing/deleting data and/or decommissioning/shutting down the host resources for the provisioned cluster 824).

Although FIGS. 2-8 have been described and illustrated in the context of a provider network implementing different data processing services, like a data warehousing service, the various components illustrated and described in FIGS. 2-8 may be easily applied to other data processing systems that can utilize additional query engines to provide for secondary query performance capacity. As such, FIGS. 2-8 are not intended to be limiting as to other embodiments of dynamically assigning queries to secondary processing resources.

Figure 9:
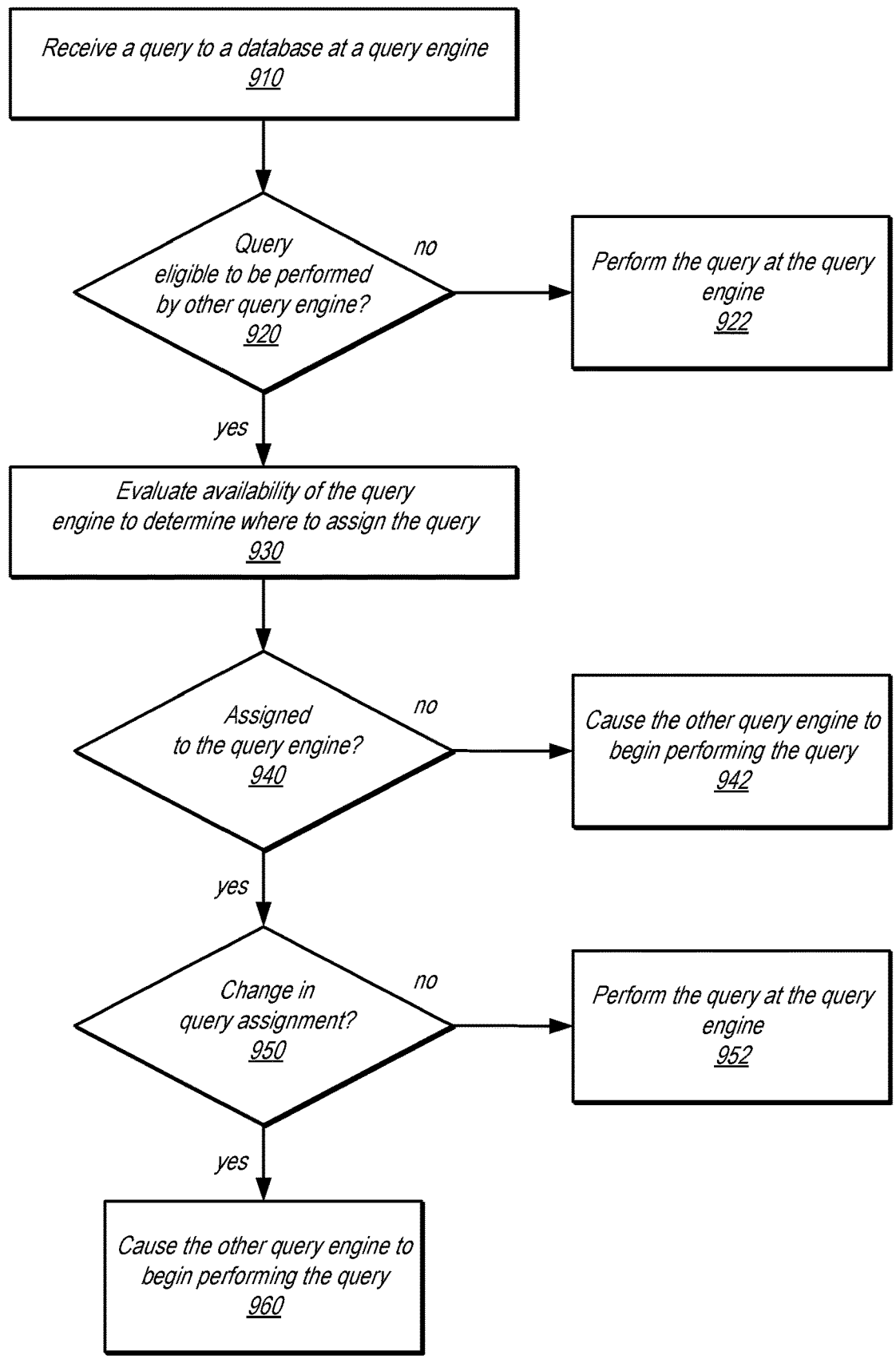
FIG. 9 is a high-level flowchart illustrating methods and techniques to implement dynamically assigning queries to secondary processing resources, according to some embodiments.

FIG. 9 is a high-level flowchart illustrating methods and techniques to implement dynamically assigning queries to secondary processing resources, according to some embodiments. Various different systems and devices may implement the various methods and techniques described below, either singly or working together. Different combinations of services implemented in different provider networks operated by different entities may implement some or all of the methods (e.g., a data warehouse cluster in a service of a first provider network, an intermediate data processing service in a second provider network, and a data set stored in a service of a third provider network). Different types of query engines or non-distributed query performance platforms may implement these techniques. Alternatively, various other combinations of different systems and devices located within or without provider networks may implement the below techniques. Therefore, the above examples and or any other systems or devices referenced as performing the illustrated method, are not intended to be limiting as to other different components, modules, systems, or devices.

As indicated at 910, a database query may be received at a query engine, in various embodiments. The database query may be received according to various interfaces, formats, and/or protocols. For example, the database query may be formatted according to a query language such as Structured Query Language (SQL), in some embodiments, or may be specified according to an Application Programming Interface (API) for receiving queries. In at least some embodiments, the database query may be one query of many queries that can be submitted by one or many different users to a same database engine, processing platform, or system. For example, the database query may compete for computing resources along with other queries received from other users to be executed with respect to a database in some embodiments. In at least some embodiments, the query may be received at a primary query engine (e.g., received at a primary processing cluster as discussed above with regard to FIGS. 5-7).

As indicated at 920, a determination may be made as to whether the query is eligible to be performed by another query engine. For example, if the query is type of a query that performs certain operations (e.g., Data Manipulation Language (DML) operations, data definition language (DDL) operations, or evaluates system tables), then the query may not be eligible for processing at another query engine. In some embodiments, if a backup of the database (or portion of the database targeted by the query) is not made to be accessible to the secondary query engine, then the query may not be eligible. In such scenarios, a backup of the database may be created in response to the request so that a subsequent query that is the same is received. In some embodiments, eligibility may be determined according to the source of the query (e.g., as some applications may not be allowed to utilize secondary query processing resources). In some embodiments, a queue identified for the query may dictate whether the query is eligible. If not eligible, then as indicated at 922, the query engine may perform the query.

Figure 10:
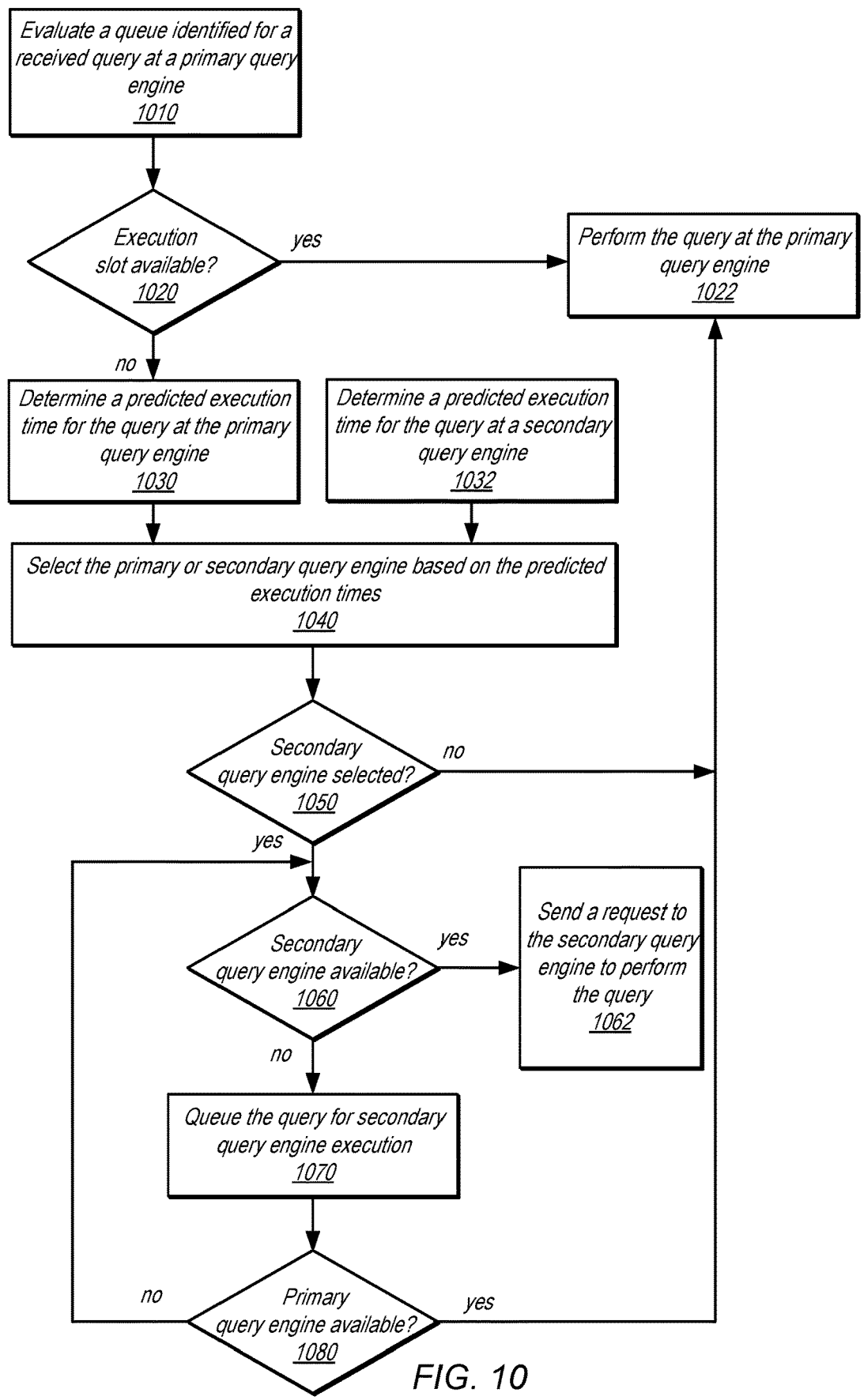
FIG. 10 is a high-level flowchart illustrating methods and techniques to implement selecting between primary and secondary processing resources, according to some embodiments.

As indicated at 930, the availability of the query engine to perform the query may be evaluated to determine where to assign the query if the query is eligible, in some embodiments. For example, if the query engine has availability, then the query may still be assigned to the query engine instead of the other query engine. If the query engine does not have availability (e.g., the query has to queue and wait), then the other query engine may be selected. FIG. 10, discussed below, provides various selection techniques that may be applied.

As indicated by the negative exit from 940, if the query engine is not assigned to the query engine, then the other query engine may be caused to begin performing the query, in some embodiments, as indicated at 942. For example the query may be forwarded and sent to an identified other query engine. In some embodiments, the other query engine may be provisioned in response to the query (e.g. as discussed above with regard to FIG. 8). In some embodiments, the query may be sent as part of a batch of queries to be performed by the other query engine.

As indicated by the positive exit from 940, the query engine may be assigned to the query engine. In some embodiments, this assignment may not change. For instance, an available execution slot at the query engine may be ready to begin the query. Thus, as indicated by the negative exit from 950, the query may be performed at the query, as indicated at 952. However, in some scenarios, as discussed below with regard to FIGS. 10 and 11, a change in the query assignment can happen, such as different availability of secondary query engines. In such a scenario, the other query engine may be caused to begin performing the query, as indicated at 960.

Various exceptions, alternative conditions, or further evaluations may be performed for queries greater than or equal to the size threshold in order to determine to perform it at the second query engine, which may be the secondary performance resource, in some embodiments. For instance, FIG. 10, discussed below provides various different scenarios in which a query may still be performed at the first query engine if the size is greater than or equal to the size threshold which are not illustrated.

Various techniques for how to make an assignment of a query between different query engines may be implemented, as noted above. FIG. 10 is a high-level flowchart illustrating methods and techniques to implement selecting between primary and secondary processing resources, according to some embodiments. As indicated at 1010, a queue identified for a received query at a primary query engine may be evaluated, in various embodiments. For instance, the source of the query (e.g., the client application or user identifier or role associated with the query) may identify which queue the query belongs to and thus may determine query handling and assignment techniques that are to be applied to the query. As indicated at 1020, a determination as to whether an execution slot for the query is available in the queue. If so, then as indicated at 1022, the query may be performed at the primary query engine, in some embodiments.

If not, then a selection between primary and secondary query engines may be made. For example, as indicated at 1030, a predicted execution time for the query at the primary query engine may be determined, in some embodiments. Similarly, a predicted execution time for the query at a secondary query engine may be determined, as indicated at 1032, in some embodiments. As discussed above with regard to FIG. 7, different classification schemes or techniques may be applied. Size classifiers predictive of the size or execution time of a query trained on the performance of previous database queries may be used to evaluate features of a received database query and identify a probability that the query is similar in size to a known size of a previous query, in some embodiments. These classification techniques may be dynamically updated so that as the size of queries received changes over time, in some embodiments, so that the determined size for a received query may adjust accordingly (e.g., "small/short" queries may change from less than 5 seconds to less than 10 seconds over time). Other classification techniques, including performance timeouts (e.g., performing a query until it runs longer than a threshold so that it can be determined to have a size longer than a threshold) may be implemented, in some embodiments. In some embodiments, a size of a query may be indicative of resource utilization, amount of data to be read, expected size of results, or other indication of work or cost to perform the query, and thus the previous examples discussing time are not intended to be limiting.

As indicated at 1040, the primary or secondary query engine may be selected based on the predicted execution times, in some embodiments. For example, if the query is classified as short and thus a smaller execution time at the primary query engine, then the primary query engine may be selected (which may ignore or supersede a similar or shorter prediction for the secondary query engine given some performance benefit for performing a query locally). Alternatively, the shortest predicted execution time may determine which query engine is selected.

If a secondary query engine is not selected as indicated by the negative exit from 1050, then the query may be performed at the primary query engine. As discussed below with regard to FIG. 11, the query could be queued at the primary query engine and potentially reassigned to the secondary query engine (or another secondary query engine, in some circumstances).

If the secondary query engine is selected, then as indicated at 1060, a determination may be made as to whether the secondary query engine is available to perform the query, in some embodiments. If so, then as indicated at 1062, a request may be sent to the secondary query engine to perform the query, in some embodiments. If the secondary query engine is not available then the query may be queued for later performance at the secondary query engine, as indicated at 1070, in some embodiments.

As indicated at 1080, in some scenarios the primary query engine may become available (e.g., an execution slot may become free). If so, then as indicated by the positive exit from 1080, the query may be reassigned and performed by the primary query engine. However, if the primary query engine does not become available then the query may remain queued until the secondary query engine becomes available, in some embodiments, as indicated by the negative exit from 1080.

Figure 11:
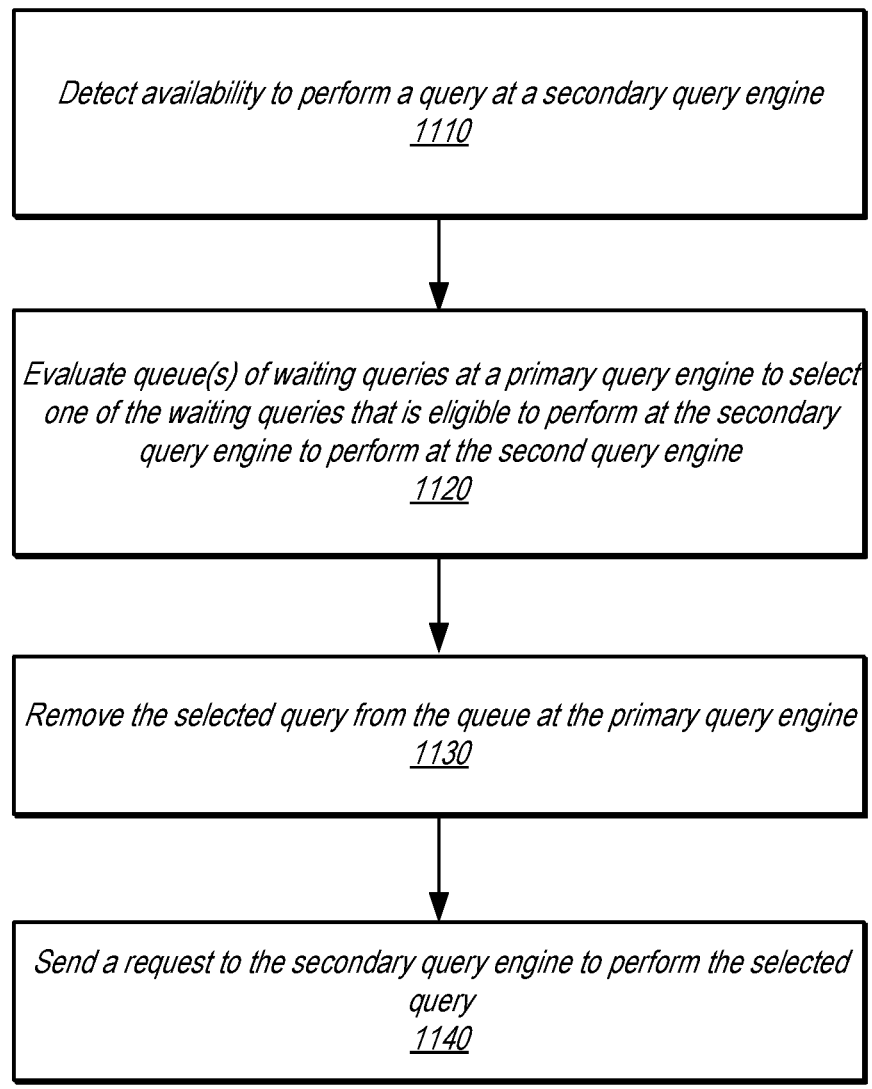
FIG. 11 is a high-level flowchart illustrating methods and techniques to implement reassigning a waiting query to a secondary processing resource, according to some embodiments.

Although initial assignments can be made, as discussed in the techniques above, circumstances may change after initial assignments in which reassigning a query to a different query engine may be more optimal for the query and/or the workload of a query engine. FIG. 11 is a high-level flowchart illustrating methods and techniques to implement reassigning a waiting query to a secondary processing resource, according to some embodiments.

As indicated at 1110, availability of a secondary query engine to perform a query may be detected, in some embodiments. For example, the query results of a prior query may be received at the primary query engine indicating that the query engine is free for another query. In some embodiments, an indication of a newly provisioned secondary query engine, as discussed above with regard to FIG. 8, may be received, in some embodiments.

As indicated at 1120, queue(s) of waiting queries at a primary query engine may be evaluated to select one of the waiting queries that is eligible to perform at the secondary query engine to perform at the secondary query engine, in some embodiments. For example, a query that is at the head of a queue (e.g., next to be performed at the primary from that queue) may be selected if eligible (e.g., according to the techniques discussed above with regard to FIG. 9). Or, in another technique a query at the tail of the query (e.g., last to be performed in the queue) may be selected if eligible. Alternatively, selection techniques that can minimize query wait times may be employed. For instance, instead of selecting a query that is eligible to burst after a query that is ineligible in a queue, a query that is eligible to burst and before the ineligible query may be selected instead, reducing the wait time in the queue of the ineligible query. Query selection techniques may be configured or specified according to a request (as discussed above with regard to FIG. 7).

As indicated at 1130, the selected query may be removed from the queue at the primary query engine, in some embodiments. A request may be sent to the secondary query engine to perform the selected query, in some embodiments, as indicated at 1140. Alternatively, in other embodiments, the query may be kept in the queue and also performed when an execution slot becomes available according to the ordering of queries in the queue, similar to the speculative execution techniques discussed below with regard to FIG. 13, so that the first query engine to complete the query may provide the result for the query.

Figure 12A:
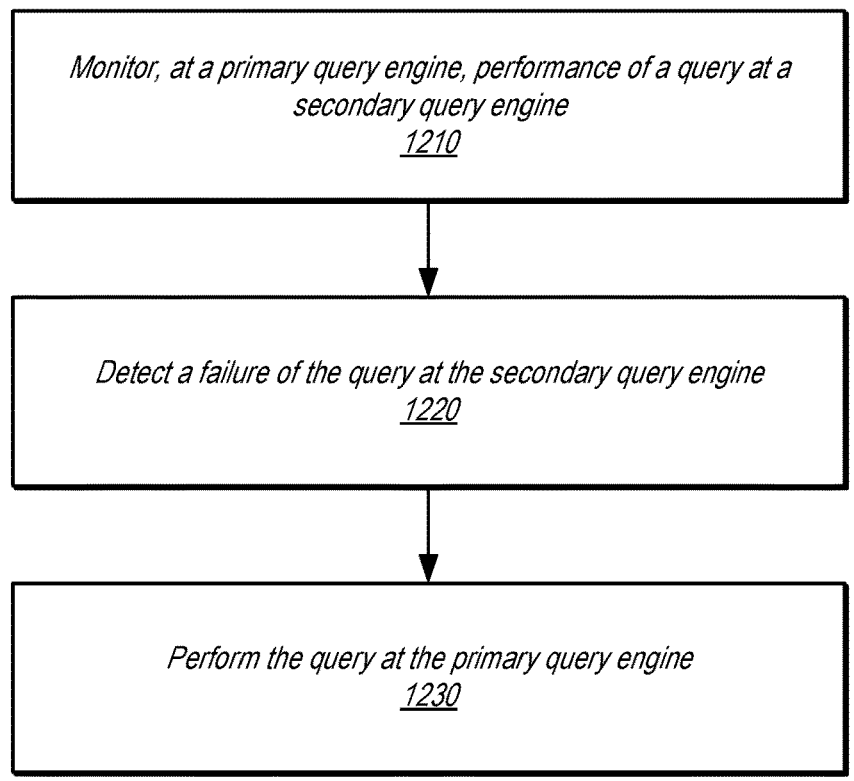
FIGS. 12A and 12B are high-level flowcharts illustrating methods and techniques to implement reassigning performing queries to a different query processing resource, according to some embodiments.
Figure 12B:
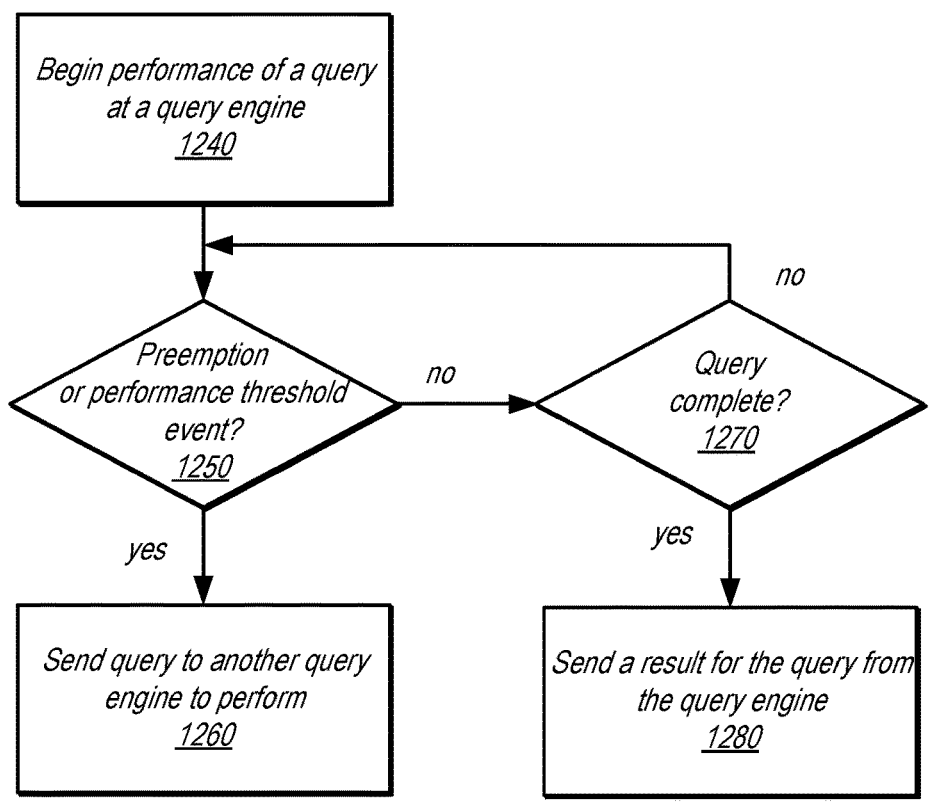

In addition to responding to changes in circumstances while a query is waiting to be performed according to its assignment (as discussed above with regard to FIGS. 10 and 11), changes in circumstances while a query is being performed can also provoke reassignment of a query to a different query engine. FIGS. 12A and 12B are high-level flowcharts illustrating methods and techniques to implement reassigning performing queries to a different query processing resource, according to some embodiments.

In FIG. 12A, failures, such as the failure of a secondary query engine may be considered. As indicated at 1210, a primary query engine may monitor the performance of a query at a secondary query engine, in some embodiments. For example, query performance metrics (e.g., progress indicators), current execution time, or other metrics may be received. A heartbeat or other communication received from the secondary query engine to indicate status may be received, in some embodiments.

As indicated at 1220, a failure of the query at the secondary query engine may be detected, in some embodiments. For example, a progress indicator may not progress, execution time may exceed an expected value, or a lack of heartbeat communication may indicate that the secondary query engine is no longer performing the query (or is unable to send results/performance information to the primary query engine due to a network partition or other external failure scenario). In response to detecting the failure of the query at the secondary query engine, the primary query engine may initiate performance of the query, as indicated at 1230, in some embodiments. For example, the query may be placed in an execution slot (if available) or in a queue at the primary query engine. In some embodiments, performance of the query at the primary query engine may be delayed a period of time to determine if the secondary query engine may become available again. If, while performing the query at the primary query engine a result indication is received from the secondary query engine (earlier determined to be failed) the results may be discarded, or in other embodiments used as the query results (e.g., similar to the speculative query execution technique discussed below with regard to FIG. 13.

FIG. 12B illustrates circumstances where a query can be reassigned by a query engine performing the query to another query engine, in some instances. For example, as indicated at 1240, performance of a query may begin at a query engine (e.g. that was assigned the query according to the techniques discussed above with regard to FIGS. 9 and 10 above). A performance threshold or preemption event may be applied for the query, in some embodiments, as indicated at 1250. For example, an execution time threshold may be evaluated to consider whether a query has exceeded an expected time for performing the query. The performance threshold may be specified in request received at the database (e.g., as discussed above with regard to FIG. 7). A preemption event may occur when a second query received after a first query is classified as shorter or otherwise more optimally performed (e.g., by evaluating a received/queued query with respect to a currently executing query that can be preempted to a second query processing by the first query engine instead of the second query engine.

If the performance threshold is exceeded for the query or if a preemption event is detected, then as indicated at 1260, the query may be sent to another query engine to perform, in some embodiments. If, for instance, the query was classified as short (or more performant on the primary query engine) but is not short according to the current execution time, then the query may be reassigned to an available secondary cluster (or queued and then sent to the next available and/or appropriate secondary cluster), in some embodiments. If, however, the performance threshold is not exceeded the query may proceed at the query engine until complete, as indicated at 1270 (or until the performance threshold is exceeded). If completed, as indicated at 1280, a result for the query may be sent from the query engine, in some embodiments.

Figure 13:
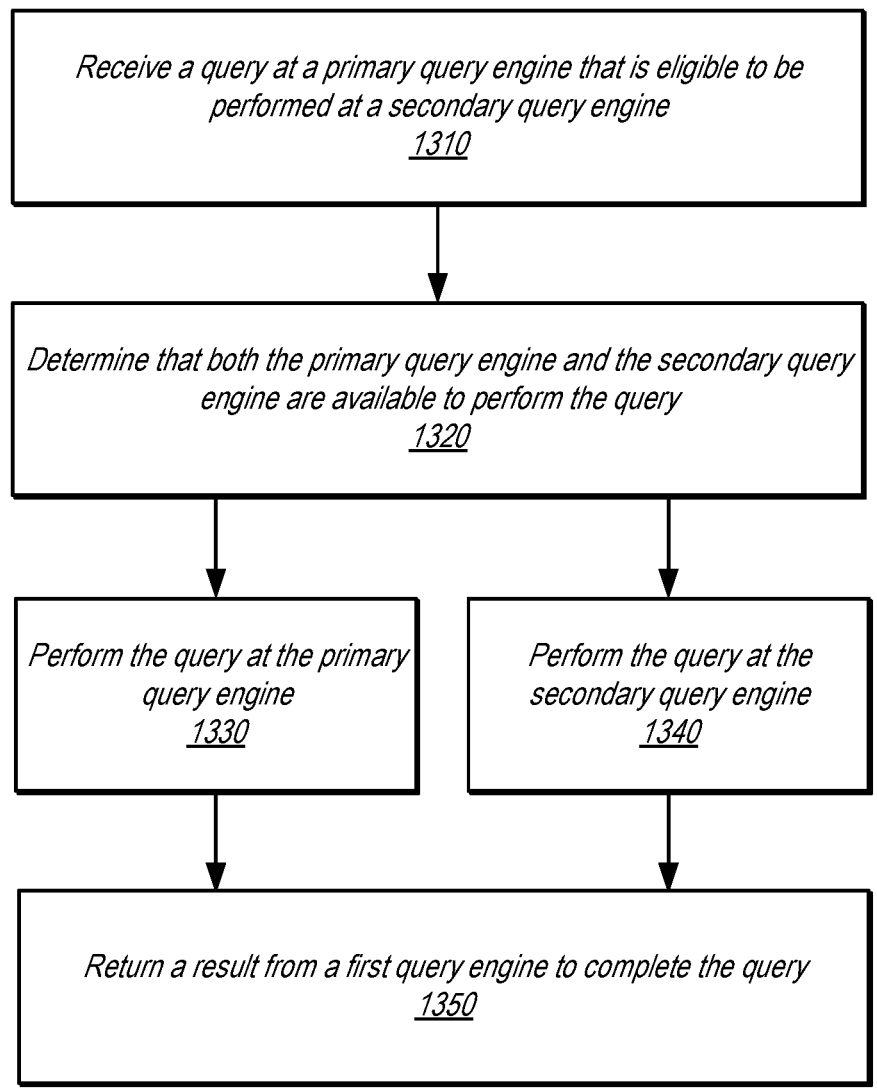
FIG. 13 is a high-level flowchart illustrating methods and techniques to implement speculative processing of a query at both primary and secondary query processing resources, according to some embodiments.

In some circumstances, there may be opportunities to take advantage of secondary processing resources to deliver results of a query as fast as possible. FIG. 13 is a high-level flowchart illustrating methods and techniques to implement speculative processing of a query at both primary and secondary query processing resources, according to some embodiments. As indicated at 1310, a query may be received at a query engine that is eligible to be performed at a secondary query engine, in some embodiments. For example, as discussed above with regard to FIG. 9, features such as the type of query (or the source of the query) may be used to determine eligibility.

Availability of both the primary query engine and a secondary query engine may be evaluated. In the event that multiple secondary query engines are provisioned for performing queries to the database, the availability of the multiple secondary query engines may be evaluated. As indicated at 1320, a determination may be made that both the primary and secondary query engine(s) are available to perform the query, in some embodiments.

As indicated at 1330, the query engine may be performed at the primary query engine. Concurrently, the query may also be performed at the secondary query engine, as indicated at 1340, in some embodiments. For example, the query may be forwarded to the secondary query engine. In some embodiments, in addition to availability, a feature or setting may be enabled to allow concurrent processing of the query at multiple query engines may be enabled (e.g., by a user or according to a workload/availability/cost evaluation for the query). In some embodiments, other determinations may be performed to determine whether to speculatively perform the query at both query engines, such as a determination that a size classification cannot be performed for the query (or performed with confidence above some threshold value) for one or both query engines.

As indicated at 1350, a result may be returned from the first query engine to complete the query, in some embodiments. In some embodiments, metadata or performance history may be updated to reflect the "winning" query engine so that if the query is received again that same query engine may be selected (instead of concurrently performing the query).

The methods described herein may in various embodiments be implemented by any combination of hardware and software. For example, in one embodiment, the methods may be implemented by a computer system (e.g., a computer system as in FIG. 14) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of dynamically assigning queries to secondary processing resources as described herein may be executed on one or more computer systems, which may interact with various other devices. One such computer system is illustrated by FIG. 14. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 14, memory 2020 may include program instructions 2025, that implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a primary query engine for a database;
   wherein the primary query engine is configured to:
     responsive to receiving a query to the database to be performed by the primary query engine, evaluate one or more features of the query to determine whether the query is eligible to be performed by a secondary query engine provisioned to perform queries to the database in response to the query or a prior query to the database;
     responsive to a determination that the query is eligible to be performed by the secondary query engine, evaluate an availability of the primary query engine to perform the query to determine whether to assign the query to be performed by the primary query engine or the secondary query engine;
     assign the query to the secondary query engine according to the evaluation of the availability indicating that the primary query engine is not available to perform the query;
     cause the secondary query engine to begin performing the query to the database.

2. The system of claim 1, wherein the primary query engine is further configured to:
   detect a failure of performing the query at the second query engine; and responsive to the detection of the failure, perform the query.

3. The system of claim 1, wherein the primary query engine is further configured to:
perform the query at the primary query engine; and
return a result from a first one of the primary query engine or the secondary query engine to complete the query.

4. The system of claim 1, wherein the primary query engine and the secondary query engine are a primary processing cluster and a secondary processing cluster respectively implemented as part of a data warehouse service of a provider network, wherein the query is determined to be eligible according to request that specifies a source of queries to be identified as eligible for performance at the secondary query engine.

5. A method, comprising:
responsive to receiving a query to a database at a first query engine to be performed by the first query engine, evaluating one or more features of the query to determine, by the first query engine, whether the query is eligible to be performed by a second query engine provisioned to perform queries to the database in response to the query or a prior query to the database;
responsive to a determination that the query is eligible to be performed by the secondary query engine, evaluating, by the first query engine, an availability of the first query engine to perform the query to determine whether to assign the query to be performed by the first query engine or the second query engine;
assigning, by the first query engine, the query to the second query engine according to the evaluation of the availability indicating that the primary query engine is not available to perform the query; and
causing, by the first query engine, the second query engine to begin performing the query to the database.

6. The method of claim 5, further comprising:
determining, by the second query engine, that performance of the query by the second query engine exceeds a performance threshold for the query; and
responsive to determining that the performance of the query by the second query engine exceeds the performance threshold, sending, by the second query engine, the query to the first query engine to be performed by the first query engine.

7. The method of claim 5, wherein the evaluating the availability of the first query engine to perform the query to determine whether to assign the query to be performed by the first query engine or the second query engine comprises determining that an execution slot was not available for the query at the first query engine.

8. The method of claim 5, wherein the evaluating the availability of the first query engine to perform the query to determine whether to assign the query to be performed by the first query engine or the second query engine comprises:
determining respective predicted execution times for the query at the first query engine and the second query engine; and
comparing the respective predicted execution times to select the second query engine.

9. The method of claim 5, further comprising:
detecting, by the first query engine, availability to perform another query at the secondary query engine;
evaluating, by the first query engine, a queue of waiting queries at the first query engine to select one of the waiting queries to perform at the secondary query engine; and sending, by the first query engine, a request to the secondary query engine to perform the selected query.

10. The method of claim 5, further comprising:
queuing, by the first query engine, another query assigned to the second query engine to be performed;
determining, by the first query engine, that an execution slot for performing the other query is available at the first query engine; and
performing, by the first query engine, the other query at the first query engine instead of at the second query engine.

11. The method of claim 5 further comprising:
receiving an assignment policy for assigning queries to the second query engine; and
wherein the evaluating the availability of the first query engine to perform the query to determine whether to assign the query to be performed by the first query engine or the second query engine is performed according to the assignment policy.

12. The method of claim 5, further comprising:
detecting, by the first query engine, a failure of performing the query at the second query engine; and
responsive to the detection of the failure, performing, by the first query engine, the query.

13. The method of claim 5, further comprising:
performing, by the first query engine, the query at the primary query engine; and
returning, by the first query engine, a result from a first one of the primary query engine or secondary query engine to complete the query.

14. One or more non-transitory, computer-readable storage media, storing program instructions that when executed on or across one or more computing devices cause the one or more computing devices to implement:
responsive to receiving a query to a database at a first query engine to be performed by the first query engine, evaluating, by the first query engine, one or more features of the query to determine eligibility of the query to be performed by a second query engine provisioned to perform queries to the database in response to the query or a prior query to the database;
responsive to identifying the query as eligible to be performed by the second query engine according to the evaluation of the eligibility of the query, evaluating, by the first query engine, an availability of the first query engine to perform the query;
assigning, by the first query engine, the query to the second query engine according to the evaluation of the availability of the first query engine indicating that the first query engine is not available to perform the query; and
causing, by the first query engine, the second query engine to begin performing the query to the database.

15. The one or more non-transitory, computer-readable storage media of claim 14, wherein, in the assigning the query to the second query engine according to the evaluation of the availability of the first query engine, the program instructions cause the one or more computing devices to implement:
determining respective predicted execution times for the query at the second query engine and a third query engine; and
comparing the respective predicted execution times of the second query engine and the third query engine to select the second query engine.

16. The one or more non-transitory, computer-readable storage media of claim 14, wherein the one or more non-transitory computer-readable storage media comprise additional program instructions that when executed by the one or more computing devices cause the one or more computing devices to implement:

detecting, by the first query engine, availability to perform another query at the secondary query engine;

evaluating, by the first query engine, a queue of waiting queries at the first query engine to select one of the waiting queries to perform at the secondary query engine; and sending, by the first query engine, a request to the secondary query engine to perform the selected query.

17. The one or more non-transitory, computer-readable storage media of claim 14, wherein the one or more non-transitory computer-readable storage media comprise additional program instructions that when executed by the one or more computing devices cause the one or more computing devices to implement:

receiving a second query at the first query engine;

begin performing, by the first query engine, the second query;

receiving a third query at the first query engine;

determining, by the first query engine, that the third query preempts performance of the second query; and responsive to determining that the third query preempts the performance of the second query:

sending, by the first query engine, the second query to the second query engine to be performed by the second query engine; and begin performing, by the first query engine, the third query.

18. The one or more non-transitory, computer-readable storage media of claim 14, wherein the one or more non-transitory computer-readable storage media comprise additional program instructions that when executed by the one or more computing devices cause the one or more computing devices to implement:

determining, by the first query engine, that performance of another query by the first query engine exceeds a performance threshold for the other query; and responsive to determining that the performance of the other query by the first query engine exceeds the performance threshold, sending, by the first query engine, the other query to the second query engine to be performed by the second query engine.

19. The one or more non-transitory, computer-readable storage media of claim 14, wherein the one or more non-transitory computer-readable storage media comprise additional program instructions that when executed by the one or more computing devices cause the one or more computing devices to implement:

performing, by the first query engine, the query at the primary query engine; and returning, by the first query engine, a result from a first one of the primary query engine or secondary query engine to complete the query.

20. The one or more non-transitory, computer-readable storage media of claim 14, wherein the one or more non-transitory computer-readable storage media comprise additional program instructions that when executed by the one or more computing devices cause the one or more computing devices to implement:

receiving, by the first query engine, a request that specifies a source of queries to be identified as eligible for performance at the second query engine; and wherein the identifying the query as eligible is received from the specified source.

\* \* \* \* \*